(12) United States Patent
Murakami

(10) Patent No.: US 7,796,185 B2
(45) Date of Patent: Sep. 14, 2010

(54) DRIVING METHOD FOR SOLID-STATE IMAGING DEVICE AND SOLID-STATE IMAGING DEVICE

(75) Inventor: Ichiro Murakami, Kyoto (JP)

(73) Assignee: Panasonic Corporation, Osaka (JP)

( * ) Notice: Subject to any disclaimer, the term of this patent is extended or adjusted under 35 U.S.C. 154(b) by 623 days.

(21) Appl. No.: 11/735,740

(22) Filed: Apr. 16, 2007

(65) Prior Publication Data
US 2007/0247536 A1 Oct. 25, 2007

(30) Foreign Application Priority Data
Apr. 25, 2006 (JP) ............................. 2006-121293
Feb. 2, 2007 (JP) ............................. 2007-023993

(51) Int. Cl.
*H04N 5/235* (2006.01)
(52) U.S. Cl. .................. 348/362; 348/208.4; 348/229.1
(58) Field of Classification Search .............. 348/208.4, 348/208.5, 208.6, 208.99, 208.2, 208.12, 348/208.13, 208.16, 221.1, 229.1, 230.1, 348/362, 367, 248–250, 311, 317, 319
See application file for complete search history.

(56) References Cited

U.S. PATENT DOCUMENTS

| 4,614,966 | A | * | 9/1986 | Yunoki et al. ............... 348/282 |
| 4,647,975 | A | * | 3/1987 | Alston et al. .............. 348/222.1 |
| 4,758,895 | A | * | 7/1988 | Elabd .......................... 348/319 |
| 5,264,944 | A | * | 11/1993 | Takemura ..................... 386/38 |
| 5,546,127 | A | * | 8/1996 | Yamashita et al. .......... 348/297 |
| 5,929,908 | A | * | 7/1999 | Takahashi et al. ........... 348/364 |
| 6,204,881 | B1 | * | 3/2001 | Ikeda et al. ................. 348/362 |
| 6,441,851 | B1 | * | 8/2002 | Yonemoto ................... 348/294 |

(Continued)

FOREIGN PATENT DOCUMENTS

JP 6-207851 7/1994

(Continued)

OTHER PUBLICATIONS

English Language Abstract of JP 6-207851.

(Continued)

*Primary Examiner*—Lin Ye
*Assistant Examiner*—Chriss S Yoder, III
(74) *Attorney, Agent, or Firm*—Greenblum & Bernstein, P.L.C.

(57) ABSTRACT

There is provided a driving method for a solid-state imaging device in which the number of effective pixels is not reduced, a difference between resolutions in a vertical direction and a horizontal direction is not caused, blurring of an image is reduced as compared with conventional cases, image inconsistency at high luminance is not caused, and the dynamic range is wide. The driving method for the solid-state imaging device includes, for each pixel, an adding step of adding a first signal charge generated from incident light at a first sensitivity within a field period of a field which temporally precedes a predetermined field, out of two different fields located at a temporally equal distance from the predetermined field, the two different fields and the predetermined field being included in a frame, a second signal charge generated from incident light at a second sensitivity within a field period of the predetermined field, and a third signal charge generated from incident light at the first sensitivity within a field period of a field which temporally follows the predetermined field out of the two different fields.

10 Claims, 22 Drawing Sheets

U.S. PATENT DOCUMENTS

| | | | |
|---|---|---|---|
| 6,486,460 B1 | 11/2002 | Murakami et al. | |
| 7,538,794 B2 * | 5/2009 | Turley et al. | 348/208.1 |
| 7,538,802 B2 * | 5/2009 | Lee | 348/229.1 |
| 2005/0046708 A1 * | 3/2005 | Lim et al. | 348/231.6 |
| 2006/0102827 A1 | 5/2006 | Kasuga et al. | |
| 2006/0208158 A1 | 9/2006 | Masashi | |

FOREIGN PATENT DOCUMENTS

| | | |
|---|---|---|
| JP | 9-116815 | 5/1997 |
| JP | 11-234575 | 8/1999 |
| JP | 2000-092395 | 3/2000 |
| JP | 2001-086402 | 3/2001 |

OTHER PUBLICATIONS

English Language Abstract of JP 9-116815.
English Language Abstract of JP 11-234575.
English Language Abstract of JP 2000-092395.
English Language Abstract of JP 2001-086402.

* cited by examiner

DRIVING METHOD FOR SOLID-STATE IMAGING DEVICE AND SOLID-STATE IMAGING DEVICE

BACKGROUND OF THE INVENTION (1) Field of the Invention

The present invention relates to a solid-state imaging device.

(2) Description of the Related Art

Demand for video cameras and digital still cameras tends to increase year by year. With increase in demand, clientele is broadened. There is, a demand for a wide dynamic range of images not only from a conventional clientele but also from a new clientele. Thus, development that meets customers' needs is required for a solid-state imaging device, particularly, a charge coupled device (CCD) solid-state imaging device, to be used in a camera.

A typical CCD image sensor will be described. FIG. 1 shows a configuration of a typical CCD image sensor. The CCD image sensor includes: plural photodiodes 901 arranged in a matrix; vertical CCDs 903, each of which is a charge transfer path in a vertical direction arranged on a left side of each row of the photodiodes 901; a horizontal CCD 907 which is a charge transfer path in a horizontal direction arranged at lower ends of the rows of the vertical CCDs 903; and an output unit 908 that outputs a voltage value corresponding to charges to outside of the CCD image sensor. A photodiode 901 converts incident light to a charge and the corresponding transfer gate 902 transfers the photoelectrically converted charge to the corresponding vertical CCD 903. The vertical CCD 903 transfers the transferred charge to the horizontal CCD 907. The horizontal CCD 907 transfers the charge transferred from the vertical CCD 903 to the output unit 908. The output unit 908 converts the charge to a voltage and outputs the obtained voltage value to outside of the CCD image sensor.

Now, conventional methods for improving a dynamic range will be described. There are three conventional methods for improving a dynamic range and thus will be described in turn.

First, a first conventional method for improving a dynamic range (see, for example, Japanese Laid-Open Patent Application No. 11-234575) will be described using FIG. 2. FIG. 2 is a diagram for describing the first method. A difference between a CCD image sensor of FIG. 2 and the CCD image sensor of FIG. 1 is as follows. In the CCD image sensor of FIG. 1, one pixel includes one photodiode 901; on the other hand, in the CCD image sensor of FIG. 2, a pixel 909 includes two photodiodes 909a and 909b located above and below. The sensitivity of a pixel A corresponding to the photodiode 909a is different from that of a pixel B corresponding to the photodiode 909b. The sensitivity of the pixel A is lower than that of the pixel B. In the CCD image sensor of FIG. 2, the pixel 909 includes a pixel A and a pixel B located above and below. A signal from the pixel A is stored in a memory 911. A signal from the pixel B is directly outputted to an adding circuit 913 and added, by the adding circuit 913, to the signal from the pixel A previously stored in the memory 911, and then the added signal is outputted.

FIG. 3 shows characteristic curves of a signal charge relative to incident light in the first method. A signal charge obtained as a whole is a charge to be obtained by adding together a signal charge within a luminance range of a pixel A and a signal charge within a luminance range of a pixel B. As shown in FIG. 3, when one pixel includes a pixel A and a pixel B, the dynamic range is improved as compared with the case where one pixel includes only a pixel B.

Next, a second conventional method for improving a dynamic range (see, for example, Japanese Laid-Open Patent Application No. 2000-92395) will be described using FIG. 4. FIG. 4 is a diagram showing pulse waveforms of a VSUB voltage and a read voltage for improving the dynamic range. A period between charge accumulation times t1 and t2 in a field period of a first field is shorter than a period between charge accumulation times t3 and t4 in a field period of a second field, and the sensitivity of one same pixel is lower in the first field than in the second field.

FIG. 5 shows characteristic curves of a signal charge relative to incident light in the second method. A signal charge obtained as a whole is a charge to be obtained by adding together a signal charge within a luminance range of the first field and a signal charge within a luminance range of the second field. As shown in FIG. 5, when one frame includes a first field and a second field, the dynamic range is improved as compared with the case where one frame includes only a second field.

Finally, a third conventional method for improving a dynamic range (see, for example, Japanese Laid-Open Patent Application No. 2001-86402) will be described using FIG. 6. FIG. 6 is a diagram showing a characteristic curve of a signal charge relative to incident light in the third method. The signal charge linearly increases relative to the incident light up until the point just before a knee point. When an amount of the incident light exceeds the knee point, the signal charge logarithmic-functionally increases. Hence, in the third method, by converting the signal charge that logarithmic-functionally increases into a signal charge for the case where the signal charge is assumed to linearly increase, the dynamic range is improved. FIG. 6 shows a state in which an actual signal charge c is converted to a signal charge c'.

In the first method, however, since one pixel includes two pixels, the number of effective pixels is reduced, degrading resolution. Normally, cells of an imaging element are formed in a square or an approximately square shape such that the number of the cells is equal to the number of divisions in a vertical direction and a horizontal direction of an image to be reproduced later (and that resolutions in the vertical direction and the horizontal direction are equal). However, when the first method is used, since one pixel is formed by two pixels adjacent to each other in the vertical direction or the horizontal direction, the number of effective pixels is not equal to the number of divisions in the vertical direction or the horizontal direction (a resolution in the vertical direction or the horizontal direction) which is obtained upon image reproduction. Generally, the resolution of the human eyes strongly depends on a lower resolution, and thus, humans perceive resolution degradation. In order to obtain equal resolutions in the vertical direction and the horizontal directions, a method may be considered in which pitches in the vertical direction and the horizontal direction are made equal with two adjacent pixels as one pixel; however, this method causes a problem that the amount of saturation charges in one pixel is extremely small.

Next, in the second method, a reduction in the number of effective pixels that occurs in the first method does not occur. However, since a high-sensitivity state and a low-sensitivity state are created in a time series, upon imaging a moving object or the like, the difference in time upon obtaining information in a high luminance range and information in a low luminance range in one same pixel becomes a problem. That is, in the second method, humans see an image as if the image were blurred. When this moving image is viewed as a still image, a state in which the image is blurred becomes more apparent.

Finally, in the third method, the problem of a reduction in the number of effective pixels that occurs in the first method or the problem of blurring of an image that occurs in the second method does not occur. However, when, for example, resist shapes upon implanting impurities for forming photodiodes or the like are slightly different between pixels at the center and pixels at the periphery, variations occur in implantation density, and as a result, the amount of saturation charges in a photodiode varies from pixel to pixel. This causes a phenomenon that in a knee range the amount of accumulated charges varies from pixel to pixel. In the knee range, as described above, the signal charge logarithmic-functionally increases as the amount of incident light increases. Therefore, conversion efficiency for converting from the amount of accumulated charges to a signal voltage needs to be enhanced in a logarithmic range rather than in a linear range, and consequently, the difference in the amount of accumulated charges appears as image inconsistency at high luminance.

SUMMARY OF THE INVENTION

An object of the present invention is to provide a solid-state imaging device in which the number of effective pixels is not reduced, a difference between resolutions in a vertical direction and a horizontal direction is not caused, blurring of an image is reduced as compared with conventional cases, image inconsistency at high luminance is not caused, and the dynamic range is wide, and a driving method for the solid-state imaging device.

In order to solve the above problems and achieve the above object, the driving method for a solid-state imaging device according to the present invention is a driving method for a solid-state imaging device having pixels arranged in a matrix, and this method includes, for each of the pixels: a first holding step of holding a first signal charge in a first holding unit, the first signal charge being generated from incident light at a first sensitivity within a field period of a field which temporally precedes a predetermined field, out of two different fields located at a temporally equal distance from the predetermined field, and the two different fields and the predetermined field being included in a frame; a second holding step of holding a second signal charge in a second holding unit, the second signal charge being generated from incident light at a second sensitivity within a field period of the predetermined field; and an adding step of adding the first signal charge held in the first holding unit, the second signal charge held in the second holding unit, and a third signal charge which is generated from incident light at the first sensitivity within a field period of a field which temporally follows the predetermined field out of the two different fields.

With this method, it is possible to match the time at which the signal charge is accumulated within the field period of the predetermined field to the time which is the average of the times at which the signal charges are accumulated within the field periods of the two different fields respectively. Therefore, it is possible to achieve a driving method which not only allows expansion of a dynamic range but also reduces blurring of an image when imaging a moving object.

For example, the adding step includes: a first adding step of adding the first signal charge held in the first holding unit and the third signal charge generated from incident light at the first sensitivity within the field period of the field which temporally follows the predetermined field out of the two different fields; and a second adding step of adding the second signal charge held in the second holding unit and a signal charge which is a result of the addition performed in the first adding step.

For example, the frame includes a temporal series of a first field, a second field and a third field, and the predetermined field is the second field. The first adding step includes adding the first signal charge generated from the incident light at the first sensitivity within the field period of the first field and the third signal charge generated from the incident light at the first sensitivity within the field period of the third field, and the second adding step includes adding the second signal charge generated from the incident light at the second sensitivity within the field period of the second field and the signal charge which is the result of the addition performed in the first adding step, so as to calculate a signal charge of the frame.

For example, the frame and a frame which temporally immediately follows the frame each includes a temporal series of a first field and a second field, and the predetermined field is the second field of the frame. The first adding step includes adding the first signal charge generated from the incident light at the first sensitivity within a field period of the first field of the frame and the third signal charge generated from the incident light at the first sensitivity within a field period of the first field of the immediately following frame, and the second adding step includes adding the second signal charge generated from the incident light at the second sensitivity within a field period of the second field of the frame and the signal charge which is the result of the addition performed in the first adding step, so as to calculate a signal charge of the frame.

For example, the two different fields located at the temporally equal distance from the predetermined field are two fields located adjacent to both sides of the predetermined field. In this case, the sum of the signal charges accumulated in the field periods of the two different fields becomes closer to the signal charge accumulated in the field period of the predetermined field, compared with the case where these two different fields are not adjacent to the predetermined field. Therefore, it is possible to achieve driving which allows imaging of an object at a high luminance without generating an aliasing signal.

For example, the first sensitivity is higher than the second sensitivity. The contrast resolving power of human eyes tends to drop after peaking at an appropriate luminance level when it becomes either higher or lower than the appropriate level. For example, it is hard for human eyes to see the seam of a ball thrown by a pitcher when the luminance level is too high or too low. In view of this, by integrating only high-luminance signals, it is possible to achieve driving which allows imaging of an object without a decrease in resolution to human eyes.

For example, the first sensitivity is lower than the second sensitivity. The contrast resolving power of human eyes tends to drop after peaking at an appropriate luminance level when it becomes either higher or lower than the appropriate level. In view of this, by integrating only low-luminance signals, it is possible to achieve driving which allows imaging of an object without a decrease in resolution to human eyes.

For example, the second sensitivity is determined so that a signal charge increases linearly as an amount of the incident light increases, until a luminance which is equivalent to a maximum contrast resolving power of human eyes is generated from the incident light. By doing so, it is possible to achieve driving which allows imaging of an object without a decrease in resolution to human eyes.

For example, the first sensitivity and the second sensitivity are determined by an electronic shutter of the solid-state imaging device. When an electronic shutter is used, the sensitivity can be changed more accurately and more flexibly than the case where another means such as a mechanical shutter is used. Therefore, it is possible to reduce variation in sensitivity between pixels. In addition, it is possible to design a solid-state imaging device so as to set the knee point to an optimum value, and thus achieving driving which produces advantages in design.

A method for achieving such advantages is, for example, a driving method for a solid-state imaging device having pixels arranged in a matrix, and this method includes, for each of the pixels: a first holding step of holding a first signal charge in a first holding unit, the first signal charge being generated from incident light at a first sensitivity within a field period of a field which temporally precedes a predetermined field, out of two different fields located temporally before and after the predetermined field, and the two different fields and the predetermined field being included in a frame; a second holding step of holding a second signal charge in a second holding unit, the second signal charge being generated from incident light at a second sensitivity within a field period of the predetermined field; a weighted averaging step of performing weighted averaging of the first signal charge held in the first holding unit and a third signal charge which is generated from incident light at the first sensitivity within a field period of a field which temporally follows the predetermined field out of the two different fields, using a first period and a second period, the first period being a period from a time during accumulation of the first signal charge to a time during accumulation of the second signal charge, and the second period being a period from a time during the accumulation of the second signal charge to a time during accumulation of the third signal charge; and an adding step of adding the second signal charge held in the second holding unit and a signal charge which is a result of the weighted averaging performed in the weighted averaging step.

Even if the length of the first period is not the same as that of the second period, by performing weighted averaging of the first signal charge and the third signal charge which are generated respectively within the two different fields, it is possible to match the accumulation time of the second signal charge generated within the predetermined field to the accumulation time of the signal charge obtained as a result of the weighted averaging. By adding the second signal charge and the weighted averaged signal charge which match each other in the accumulation time, it is possible to prevent image blur when imaging of an moving object.

The solid-state imaging device of the present invention includes: a photoelectric conversion unit having pixels arranged in a matrix; for each of the pixels, a first holding unit that holds a first signal charge generated from incident light at a first sensitivity within a field period of a field which temporally precedes a predetermined field, out of two different fields located at a temporally equal distance from the predetermined field, the two different fields and the predetermined field being included in a frame; for each of the pixels, a second holding unit that holds a second signal charge generated from incident light at a second sensitivity within a field period of the predetermined field; for each of the pixels, an addition unit that adds the first signal charge held in the first holding unit, the second signal charge held in the second holding unit, and a third signal charge which is generated from incident light at the first sensitivity within a field period of a field which temporally follows the predetermined field out of the two different fields; and a control unit that controls the first sensitivity and the second sensitivity.

With this, it is possible to provide a solid-state imaging device in which the number of effective pixels is not reduced, a difference between resolutions in a vertical direction and a horizontal direction is not caused, blurring of an image is reduced as compared with conventional cases, image inconsistency at high luminance is not caused, and the dynamic range is wide.

For example, the addition unit includes: for each of the pixels, a first addition unit that adds the first signal charge held in the first holding unit and the third signal charge; and for each of the pixels, a second addition unit that adds the second signal charge held in the second holding unit and a signal charge which is a result of the addition performed by the first addition unit.

For example, the photoelectric conversion unit has: photodiodes for conversion provided for each of the pixels to convert incident light into charge; first charge transfer paths, each of which is provided for corresponding photodiodes out of the photodiodes for conversion; and first transfer gates, through each of which the charge generated by the photodiode for conversion is transferred to the corresponding first charge transfer path, the first holding unit has: the same number of photodiodes for accumulation as the photodiodes for conversion, which are arranged in the same form as the photodiodes for conversion; second charge transfer paths, each of which is provided for corresponding photodiodes out of the photodiodes for accumulation; and second transfer gates, through each of which the charge accumulated in the corresponding photodiode for conversion of the photoelectric conversion unit is accumulated in the corresponding photodiode for accumulation and then the accumulated charge is read, and the second charge transfer path functions as the first addition unit.

For example, the second charge transfer path allows a transfer of charge twice as much as or more than charge which can be transferred through the first charge transfer path. With this, it is possible to prevent charge which exceeds the capacity of the second charge transfer path from being transferred through the path, thus suppressing image inconsistency caused by saturation charge.

The solid-state imaging device of the present invention may include an electronic shutter so that the control unit can determine the first sensitivity and the second sensitivity by controlling the electronic shutter. When an electronic shutter is used, the sensitivity can be changed more accurately and more flexibly than the case where another means such as a mechanical shutter is used. Therefore, it is possible to reduce variation in sensitivity between pixels. In addition, it is possible to design a solid-state imaging device so as to set the knee point to an optimum value, and thus achieving driving which produces advantages in design.

The present invention can provide a solid-state imaging device in which the number of effective pixels is not reduced, a difference between resolutions in a vertical direction and a horizontal direction is not caused, blurring of an image is reduced as compared with conventional cases, image inconsistency at high luminance is not caused, and the dynamic range is wide, and a driving method for the solid-state imaging device.

FURTHER INFORMATION ABOUT TECHNICAL BACKGROUND TO THIS APPLICATION

The disclosure of Japanese Patent Application No. 2006-121293 filed on Apr. 25, 2006 including specification, drawings and claims is incorporated herein by reference in its entirety.

The disclosure of Japanese Patent Application No. 2007-023993 filed on Feb. 2, 2007 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENTS

The best mode for carrying out the invention will be described below with reference to the drawings.

First Embodiment

First, a configuration of a solid-state imaging device according to a first embodiment will be described.

Figure 1:
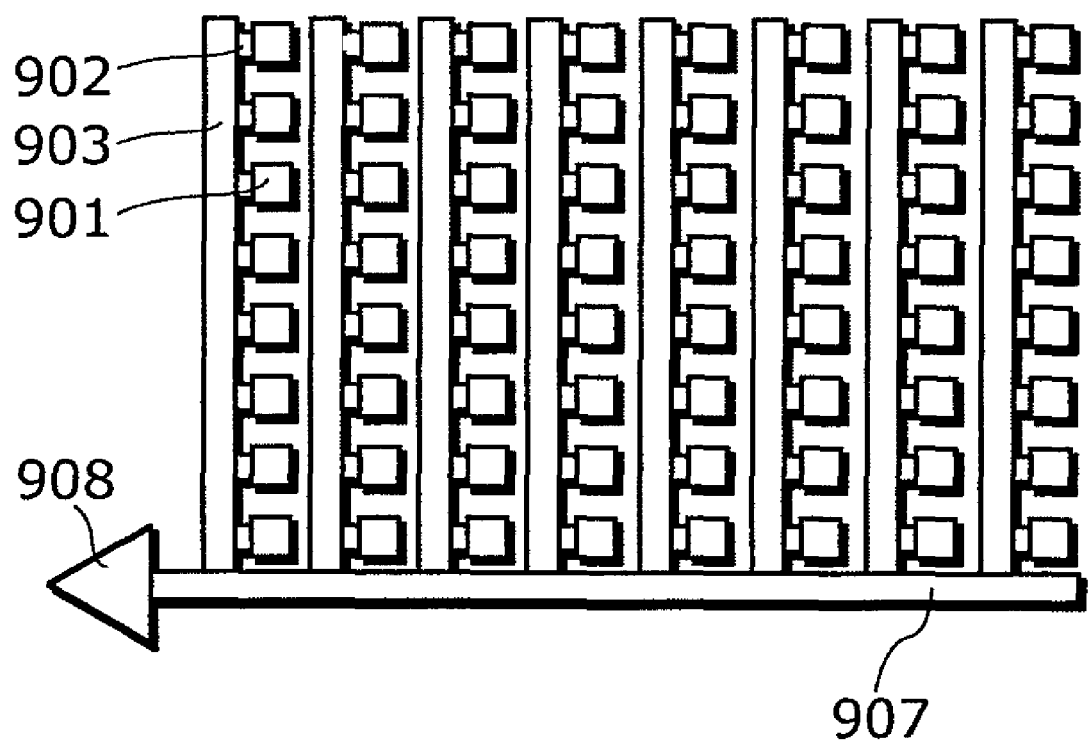
FIG. 1 is a configuration diagram of a typical CCD image sensor.
Figure 2:
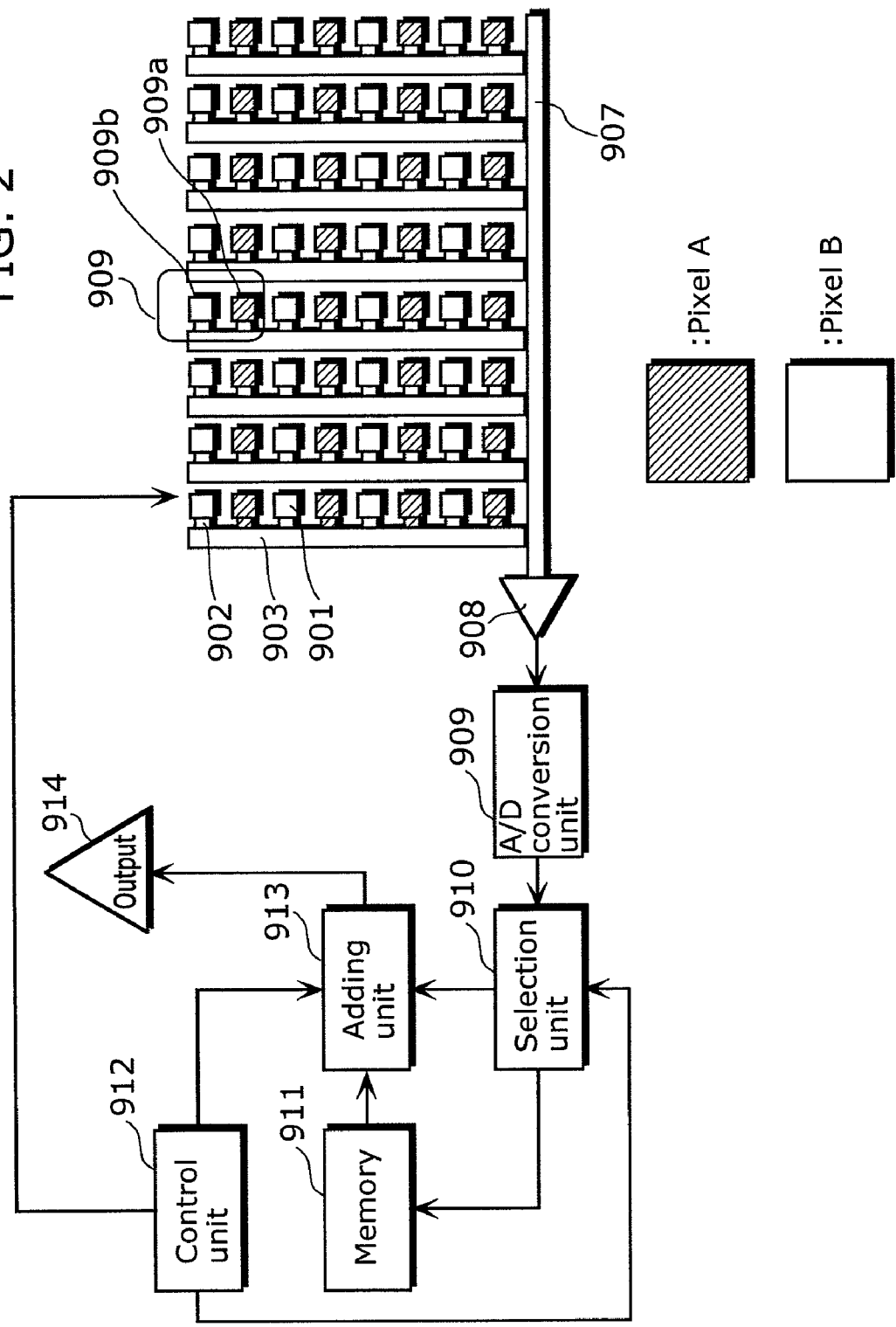
FIG. 2 is a diagram for describing a first conventional method for improving a dynamic range.
Figure 3:
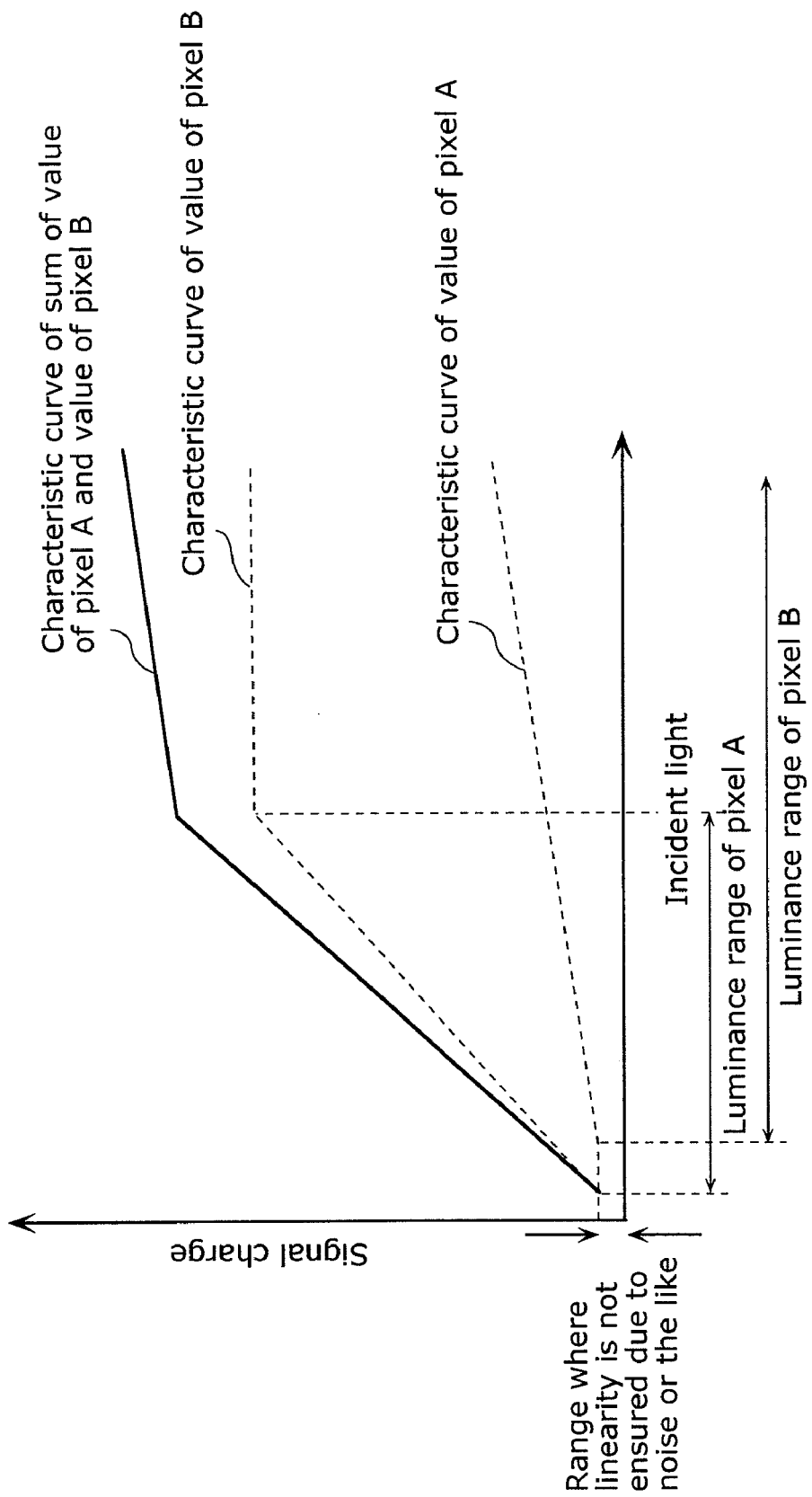
FIG. 3 is a diagram showing characteristic curves showing a relationship between incident light and a signal charge in the first method.
Figure 4:
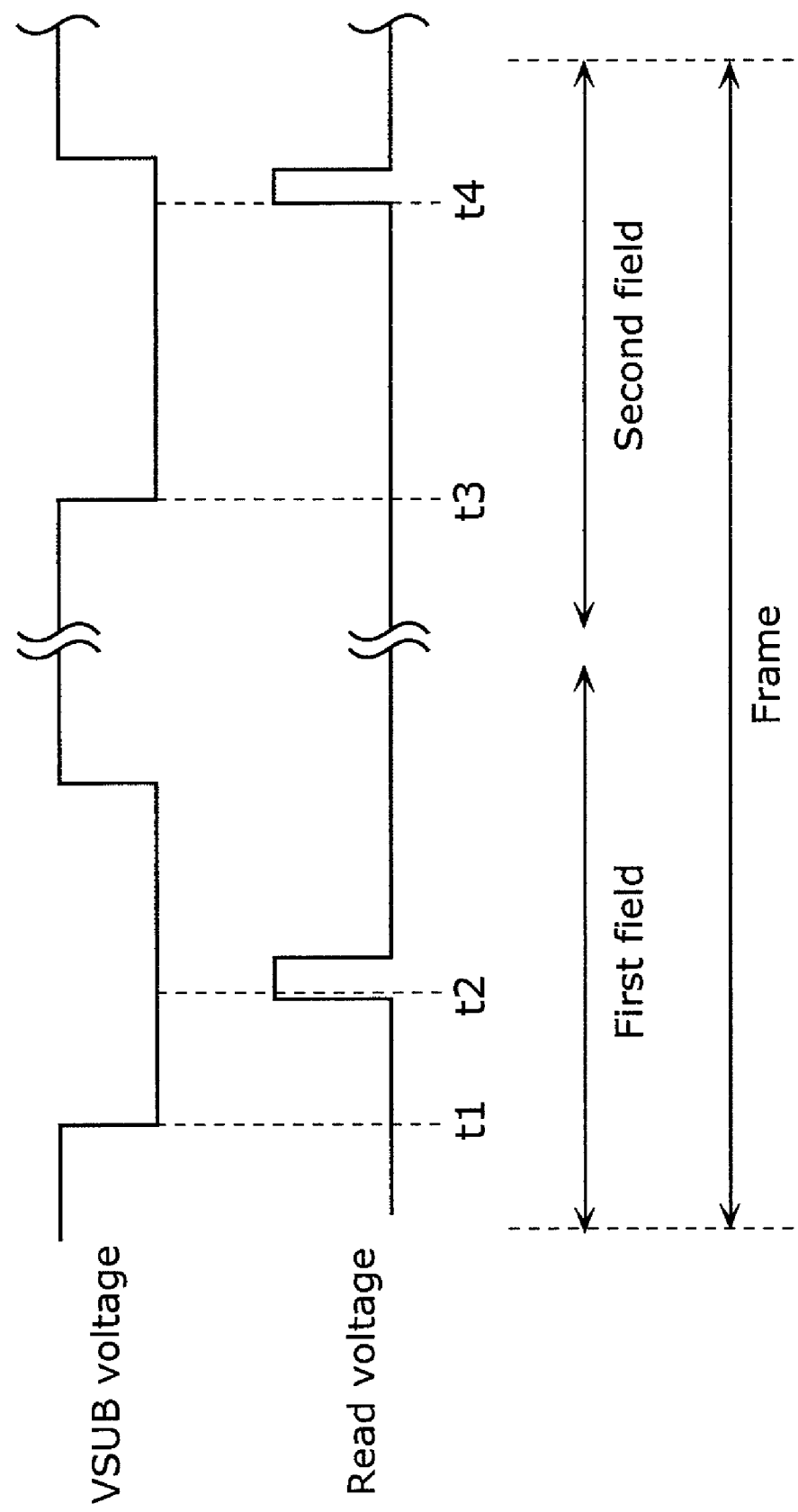
FIG. 4 is a diagram for describing a second conventional method for improving a dynamic range.
Figure 5:
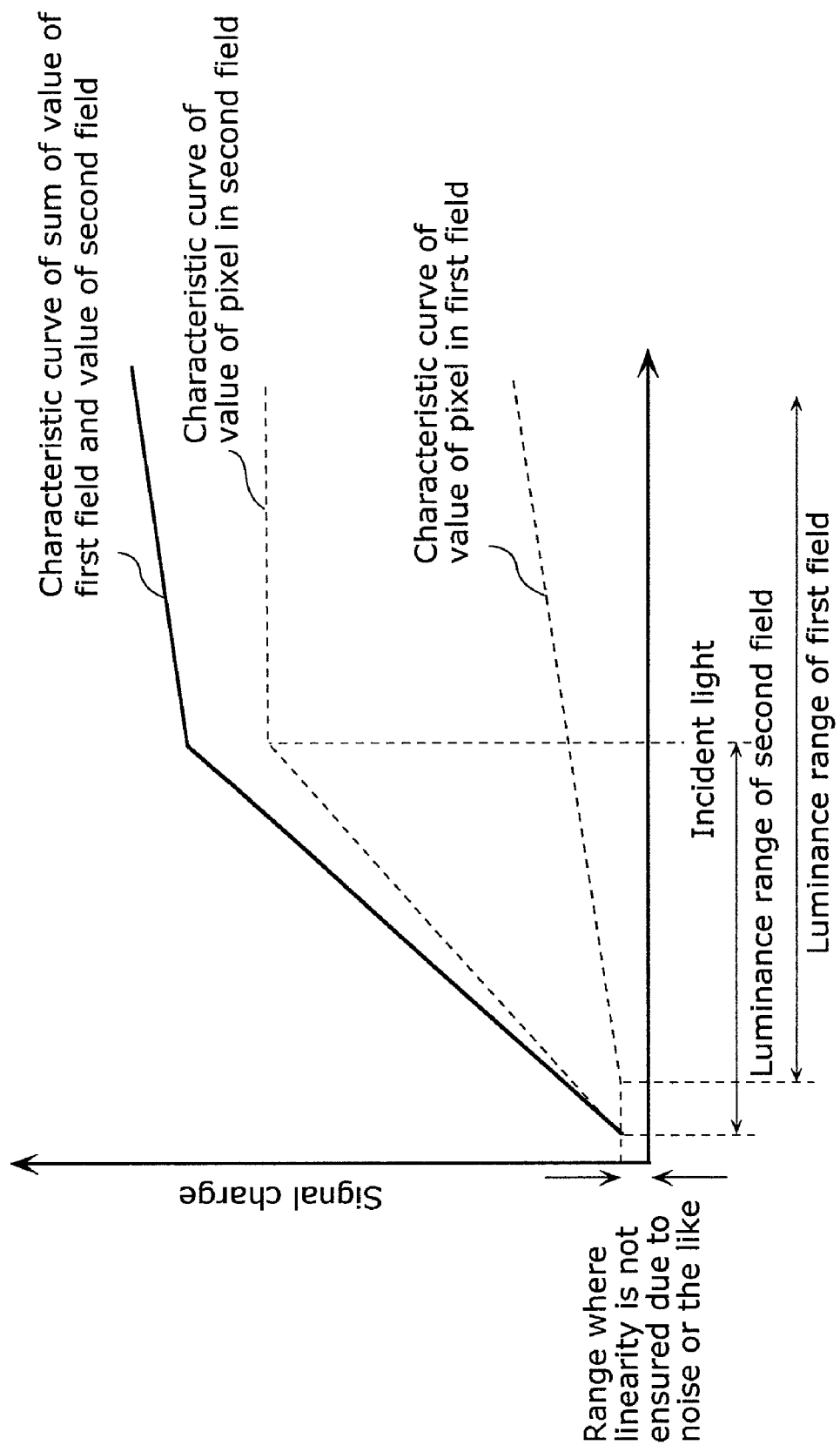
FIG. 5 is a diagram showing characteristic curves showing a relationship between incident light and a signal charge in the second method.
Figure 6:
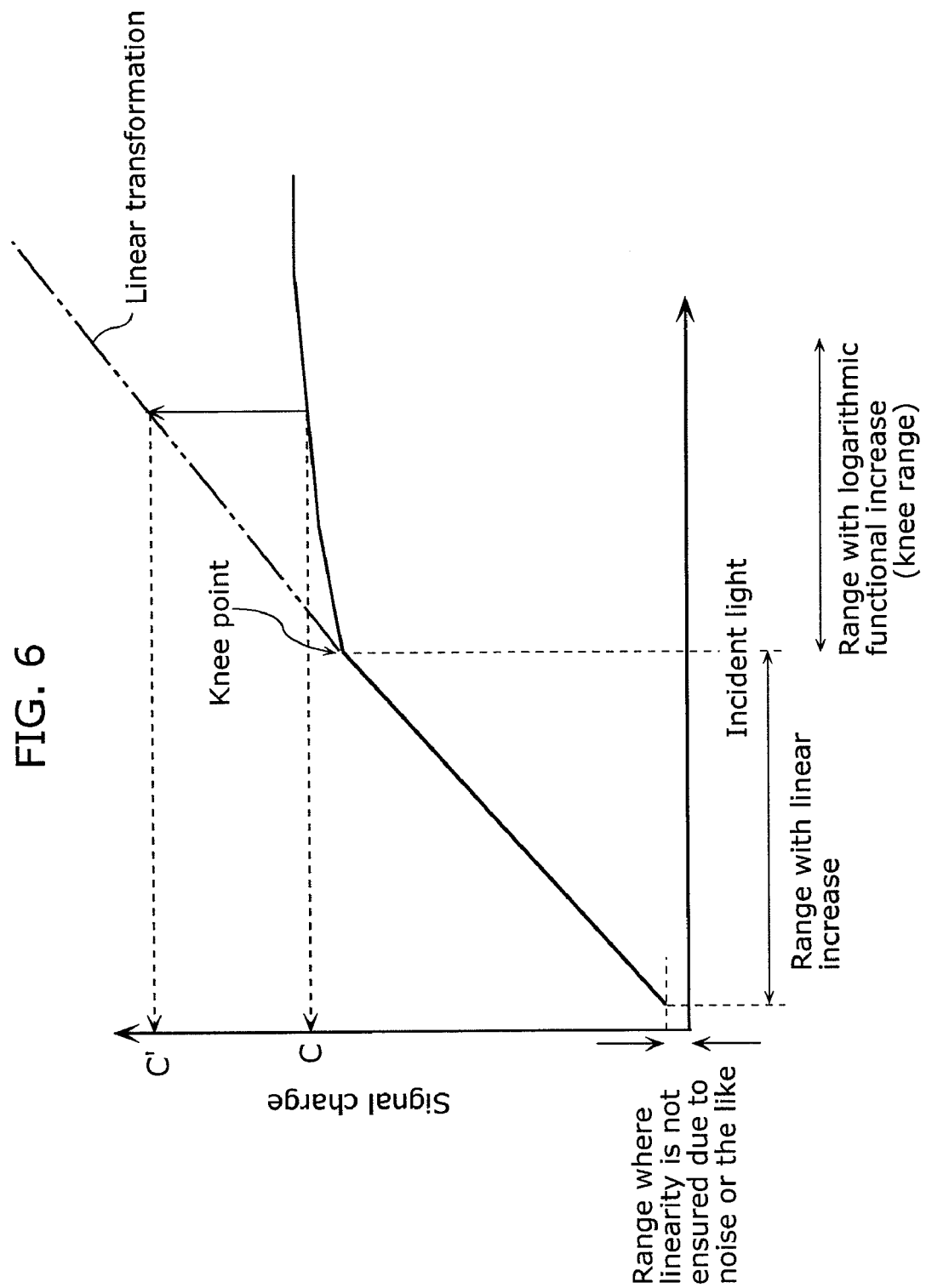
FIG. 6 is a diagram for describing a third conventional method for improving a dynamic range.
Figure 7:
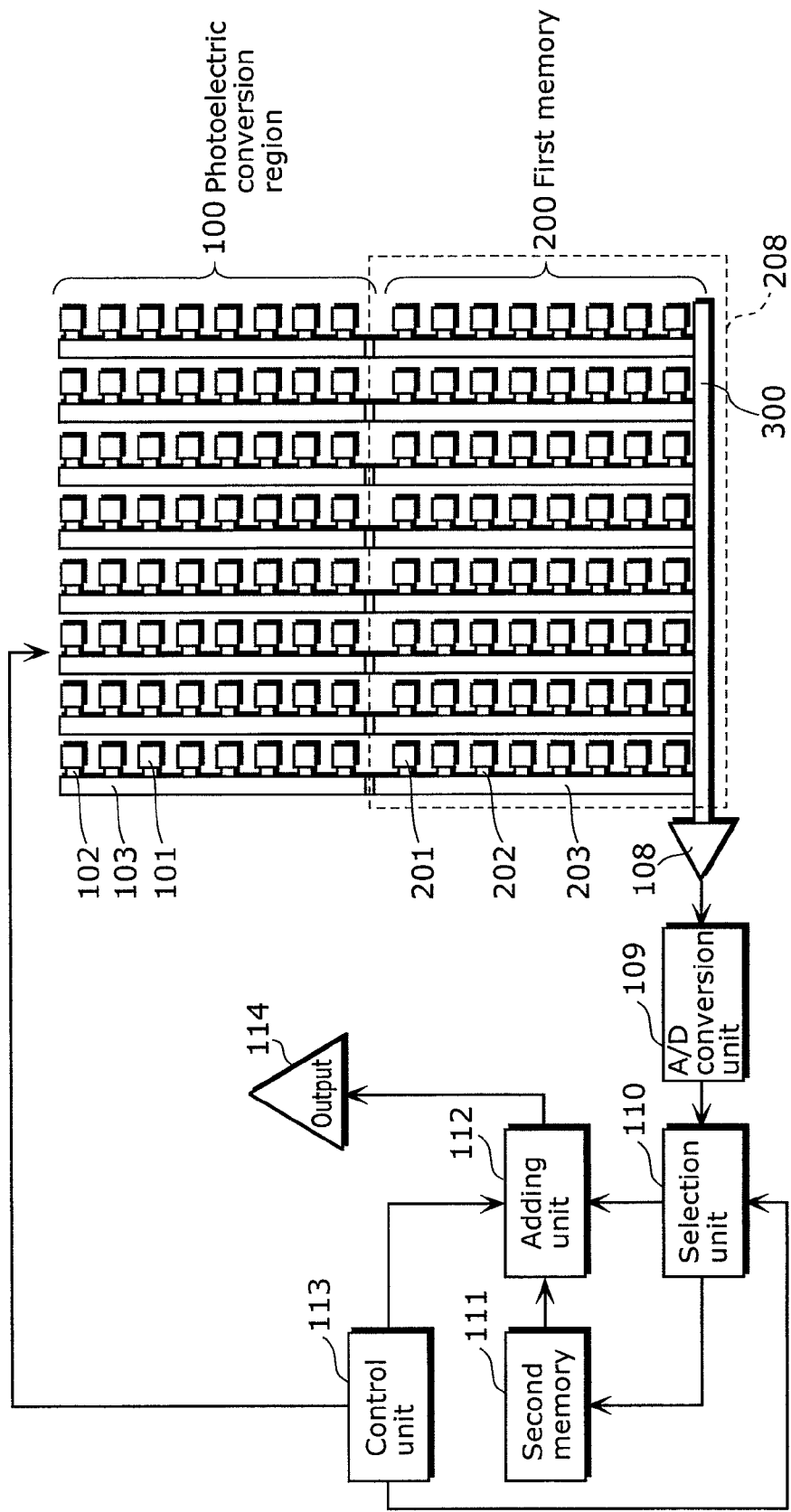
FIG. 7 is a configuration diagram of a solid-state imaging device according to a first embodiment.

FIG. 7 is a configuration diagram of the solid-state imaging device according to the first embodiment. The solid-state imaging device according to the first embodiment includes a photoelectric conversion region (solid-state imaging element) 100, a first memory 200, a horizontal CCD 300, an output unit 108, an A/D conversion unit 109, a selection unit 110, a second memory 111, an adding unit 112, a control unit 113, and an output unit 114. Though not shown, the solid-state imaging device also includes an electronic shutter.

The photoelectric conversion region 100 is a region having a function of converting incident light to a charge, and includes plural photodiodes 101 arranged in a matrix; vertical CCDs 103, each of which is a charge transfer path in a vertical direction arranged on the left side of a row of the photodiodes 101; and first transfer gates 102, each connecting a corresponding photodiode 101 to a corresponding vertical CCD 103 provided on the right side of the photodiode 101.

The first memory 200 is a region that accumulates charges obtained by the photoelectric conversion region 100 and thereby functions as a memory for the charges. The first memory 200 has plural photodiodes 201 arranged in a matrix; vertical CCDs 203, each of which is a charge transfer path in the vertical direction arranged on the left side of each row of the photodiodes 201; second transfer gates 202, provided on the left side of the respective photodiodes 201, each connecting a photodiode 201 to the corresponding vertical CCD 203; and a light-shielding film 208. As shown in FIG. 7, the number and arrangement form of the photodiodes 201 are the same as those of the photodiodes 101. The vertical CCDs 203 are connected to their corresponding vertical CCDs 103 provided thereabove. The light-shielding film 208 covers all of the photodiodes 201 and thus light does not enter any of the photodiodes 201. That is, the photodiodes 201 each have a photoelectric conversion function but do not use the function; instead, the photodiodes 201 each accumulate a charge transferred thereto and thereby function as a memory.

The horizontal CCD 300 is a charge transfer path in a horizontal direction arranged at lower ends of the vertical CCDs 203, and transfers charges from the vertical CCDs 203, to the output unit 108. The output unit 108 converts the charges from the horizontal CCD 300, into a voltage value corresponding to the charges and outputs the voltage value to the A/D conversion unit 109. The A/D conversion unit 109 converts the analog voltage value from the output unit 108, into a digital value. The selection unit 110 transfers, according to an instruction from the control unit 113, the value converted by the A/D conversion unit 109 to either the second memory 111 or the adding unit 112. The second memory 111 holds the value converted by the A/D conversion unit 109. The adding unit 112 adds together the value converted by the A/D conversion unit 109 and the value held in the second memory 111. The control unit 113 controls the operation of the photoelectric conversion region 100, the first memory 200, the horizontal CCD 300, the output unit 108, the A/D conversion unit 109, the selection unit 110, the adding unit 112, and the output unit 114. The output unit 114 outputs the value obtained by the adding unit 112 to outside of the solid-state imaging device.

Now, the operation of the solid-state imaging device according to the first embodiment will be described.

Figure 8:
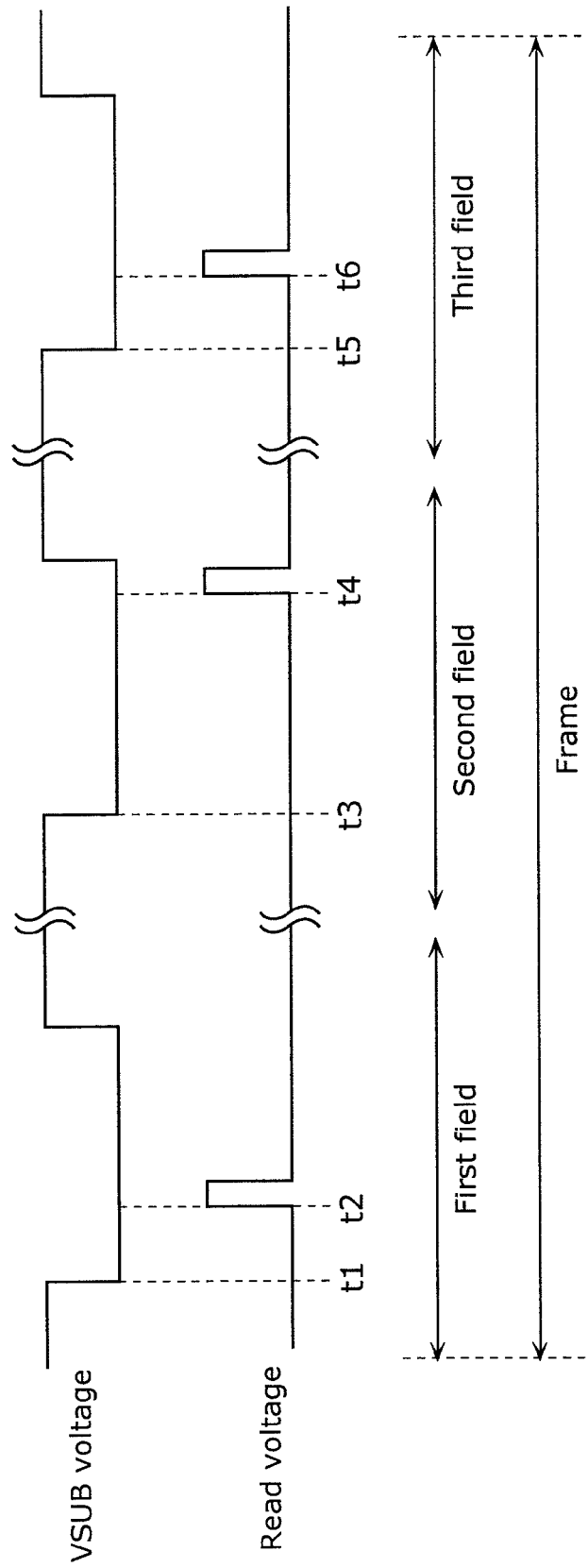
FIG. 8 is a diagram showing pulse waveforms of a VSUB voltage and a read voltage in a first field, a second field, and a third field which are included in one frame, according to the first embodiment.

In the first embodiment, one frame includes three fields. In one same pixel, the sensitivity within a field period of a first field is equal to that in a field period of a third field and the sensitivity within a field period of a second field is different from those in the field periods of the first field and the third field. The term "sensitivity" as used herein has the same meaning as a "charge accumulation period". That is, the longer the accumulation period the higher the sensitivity, and the shorter the accumulation period the lower the sensitivity. FIG. 8 shows pulse waveforms of a VSUB voltage and a read voltage for controlling the electronic shutter, in a first field, a second field, and a third field which are included in one frame.

It is assumed that, in the field period of the first field, a time at which the electronic shutter starts to stop is t1 and a read start time is t2, in the field period of the second field, a time at which the electronic shutter starts to stop is t3 and a read start time is t4, and in the field period of the third field, a time at which the electronic shutter starts to stop is t5 and a read start time is t6.

The time at which the electronic shutter starts to stop is a charge accumulation start time and the read start time is a charge accumulation end time. As described above, the sensitivity within the field period of the first field is equal to that in the field period of the third field and their sensitivities are lower than that in the field period of the second field. The term "sensitivity" has the same meaning as a "charge accumulation period". That is, the longer the accumulation period the higher the sensitivity, and the shorter the accumulation period the lower the sensitivity. Furthermore, an average of the accumulation start time in the field period of the first field and the accumulation start time in the field period of the third field and an average of the accumulation end time in the field period of the first field and the accumulation end time in the field period of the third field are within an accumulation period in the field period of the second field. These relationships can be represented by the following expressions:

$$t2-t1=t6-t5<t4-t3$$

$$t3<(t1+t5)/2<(t2+t6)/2<t4.$$

According to these relationships, the total (second signal charge) of a signal charge accumulated in the field period of the first field and a signal charge accumulated in the field period of the third field is close to a signal charge accumulated in the field period of the second field (first signal charge obtained in the field period of the second field). That is, there is a high correlation between an image to be obtained from the second signal charge and an image to be obtained from the first signal charge. This is because, since an average time at which the second signal charge is accumulated (an average of the accumulation time in the first field and the accumulation time in the third field) matches the time at which the first signal charge is accumulated, an image obtained from the second signal charge can be considered as an image obtained at the same time as an image obtained from the first signal charge.

It is desirable that the sensitivity within the field period of the second field be set so that it includes a luminance which is equivalent to the maximum contrast resolving power of human eyes. The total (second signal charge) of a signal charge accumulated in the field period of the first field and a signal charge accumulated in the field period of the third field is close to a signal charge accumulated in the field period of the second field (first signal charge obtained in the field period of the second field). That is, there is a high correlation between an image to be obtained from the second signal charge and an image to be obtained from the first signal charge. This is because, since an average time at which the second signal charge is accumulated (an average of the accumulation time in the first field and the accumulation time in the third field) matches the time at which the first signal charge is accumulated, an image obtained from the second signal charge can be considered as an image obtained at the same time as an image obtained from the first signal charge. However, the first signal charge and the second signal charge are, in practice, signals accumulated at different times and thus there is almost no chance that in a moving image the first signal charge completely matches the second signal charge. To obtain video that does not give an uncomfortable feeling to human vision, it is desirable that the accumulation period in the field period of the second field be set so that information of a luminance which is equivalent to the maximum contrast resolving power of human eyes can be obtained in the field period of the second field.

Figure 9:
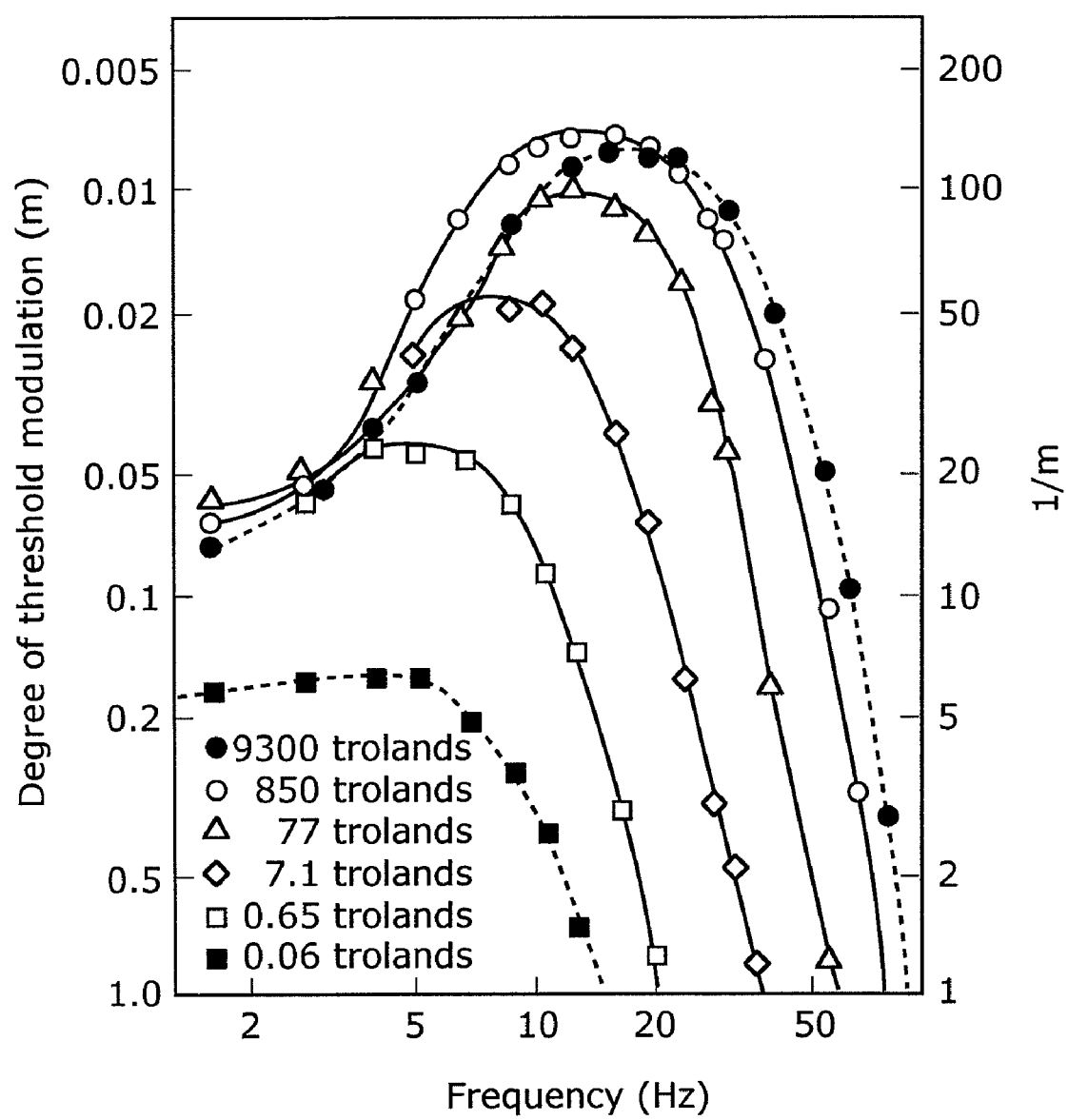
FIG. 9 is a diagram showing the contrast resolving power of human eyes (contrast discrimination ability)

FIG. 9 shows the contrast resolving power of human eyes (contrast discrimination ability). Matters regarding FIG. 9 are described in "Biological Information System Theory", Tadahiko Fukuda, pp. 70 to 71. As is clear from FIG. 9, an optimum luminance that provides maximum sensitivity is present at 850 to 9300 trolands. Thus, it is desirable that the accumulation period in the field period of the second field be set to a period during which the optimum luminance can be obtained.

Figure 10:
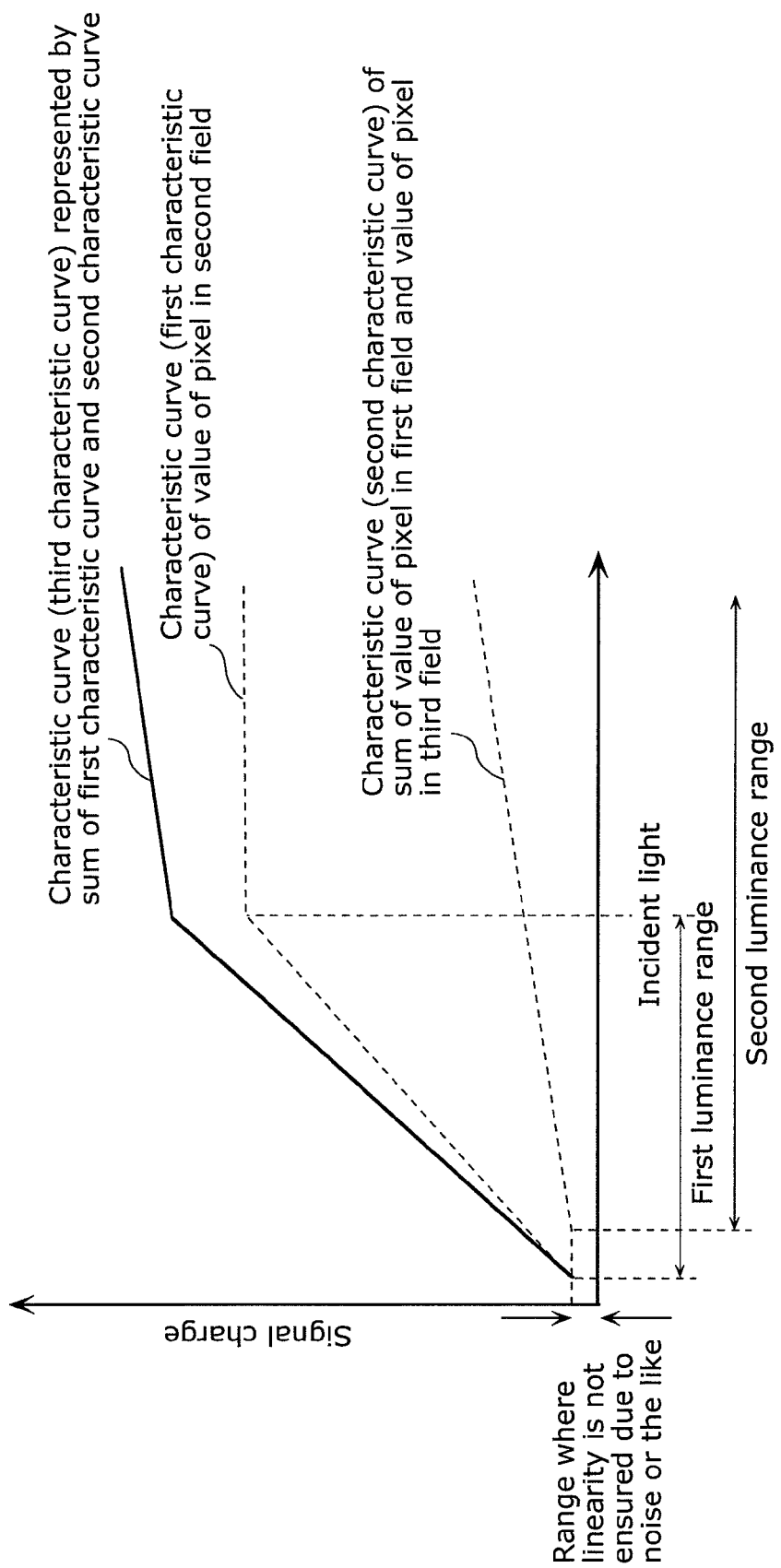
FIG. 10 is a diagram showing characteristic curves showing a relationship between incident light and a signal charge, according to the first embodiment.

FIG. 10 shows a characteristic curve (second characteristic curve) showing a second signal charge, which is the total signal charge of a signal charge accumulated in the field period of the first field and a signal charge accumulated in the field period of the third field, changing relative to luminance; a characteristic curve (first characteristic curve) showing a first signal charge, which is a signal charge accumulated in the field period of the second field, changing relative to luminance; and a characteristic curve (third characteristic curve) represented by the sum of the first characteristic curve and the second characteristic curve. The first signal charge linearly changes, in a first luminance range, with the change in luminance. The second signal charge linearly changes, in a second luminance range, with the change in luminance. Note that a loss of linearity at low luminance in both the first luminance range and the second luminance range results from that noise components, such as a dark current, shot noise, and a flaw, and low-luminance light called "dark black" are not detected as signal information. Furthermore, a loss of linearity at high luminance results mainly from the saturation of a photodiode and the capacity of a transfer path. From FIG. 10, a range where the signal charge linearly changes relative to luminance is a range where the first luminance range and the second luminance range are added together, and is obviously expanded as compared with the first luminance range. That is, the dynamic range is expanded.

Figure 11:
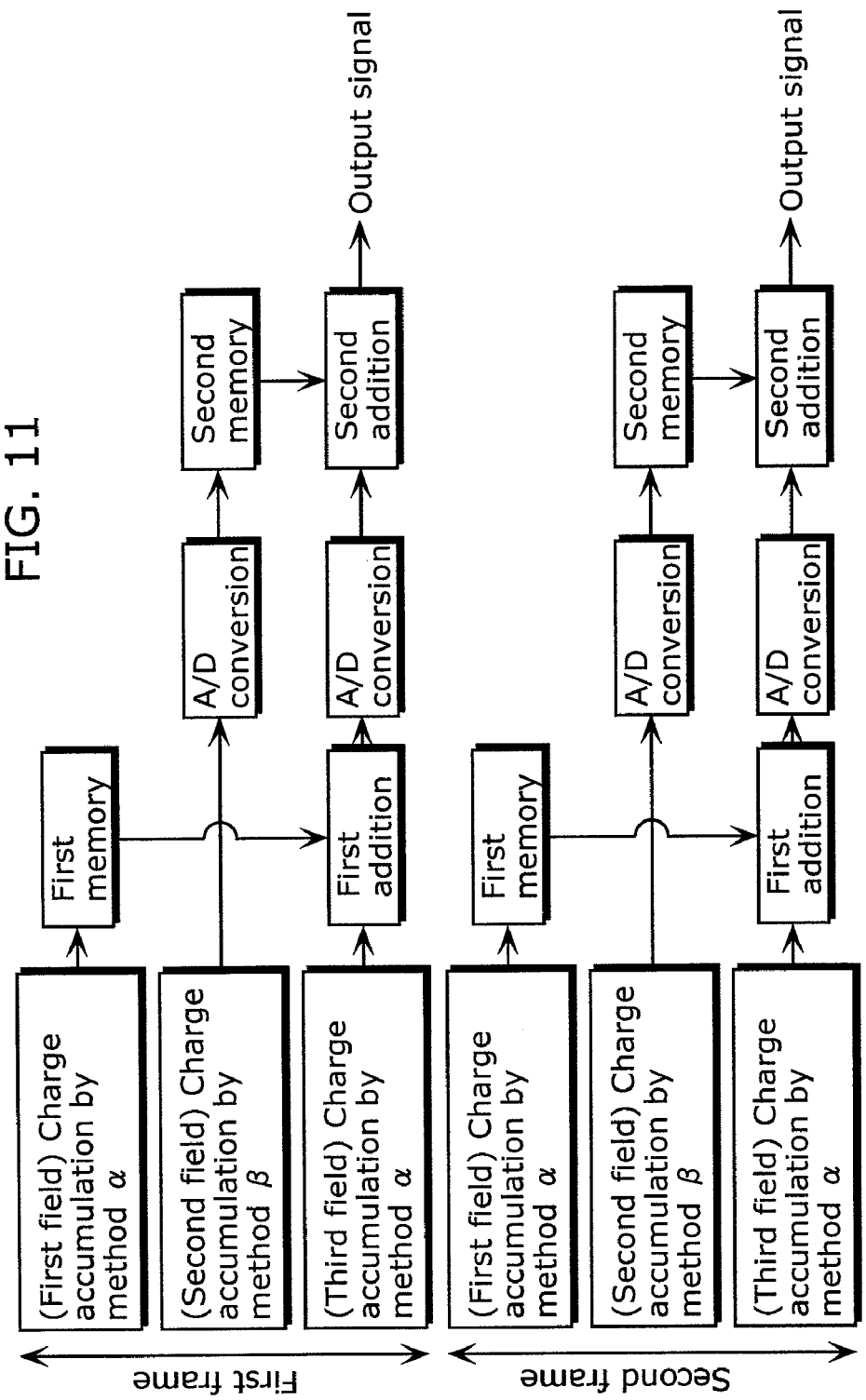
FIG. 11 is a chart showing steps of an operation of the solid-state imaging device, according to the first embodiment.

FIG. 11 is a chart showing steps of the operation of the solid-state imaging device according to the first embodiment.

In each pixel, in the field period of the first field, the photodiodes 101 included in the photoelectric conversion region (solid-state imaging element) 100 accumulate, during a period between the times t1 and t2, charges according to the amount of incident light, by a low-sensitivity imaging method α. The accumulated charges are transferred to the vertical CCDs 103 through the first transfer gates 102 and further transferred to the first memory 200. The photodiodes 201 included in the first memory 200 accumulate the charges transferred from the corresponding photodiodes 101.

In the field period of the second field, the photodiodes 101 included in the photoelectric conversion region (solid-state imaging element) 100 accumulate, during a period between the times t3 and t4, charges according to the amount of incident light, by a high-sensitivity imaging method β. The accumulated charges are transferred to the vertical CCDs 103 through the first transfer gates 102, and then transferred to the vertical CCDs 203, and further transferred to the horizontal CCD 300. Thereafter, the charges are transferred to the output unit 108. The output unit 108 converts the charges from the horizontal CCD 300, into a voltage value corresponding to the charges and outputs the voltage value to the A/D conversion unit 109. The A/D conversion unit 109 converts the value from the output unit 108, i.e., the analog voltage value corresponding to the charges (first signal charge) accumulated in the second field, into a digital value. The obtained digital value is accumulated in the second memory 111.

In the field period of the third field, the photodiodes 101 included in the photoelectric conversion region (solid-state imaging element) 100 accumulate, during a period between the times t5 and t6, charges according to the amount of incident light, by the low-sensitivity imaging method α. The accumulated charges are transferred to the vertical CCDs 103 through the first transfer gates 102 and further transferred to the first memory 200. The vertical CCDs 203 included in the first memory 200 add together the charges which are obtained in the first field and accumulated in the photodiodes 201 and the charges transferred from the corresponding photodiodes 101, so as to obtain a second signal charge. The second signal charge is transferred to the horizontal CCD 300 and thereafter transferred to the output unit 108. The output unit 108 converts the charge from the horizontal CCD 300, into a voltage value corresponding to the charge and outputs the voltage value to the A/D conversion unit 109. The A/D conversion unit 109 converts the value from the output unit 108, i.e., the analog voltage value corresponding to the charges (first signal charge) accumulated in the second field, into a digital value. The obtained digital value is accumulated in the second memory 111. The A/D conversion unit 109 converts the value from the output unit 108, i.e., the analog voltage value corresponding to the second signal charge (added signal charge), into a digital value. The adding unit 112 adds together the value corresponding to the second signal charge from the A/D conversion unit 109, and the value corresponding to the first signal charge accumulated in the second memory 111. The output unit 114 outputs a value obtained by the adding unit 112 to outside of the solid-state imaging device.

As described above, in the first embodiment, by calculating the total of the total signal charge (second signal charge) of a signal charge accumulated in the field period of the first field and a signal charge accumulated in the field period of the third field, and a first signal charge accumulated in the field period of the second field, a signal charge for one frame is obtained. A moving object linearly moves in a local short period of time. Thus, by adding together the second signal charge and the first signal charge to obtain a signal charge for one frame, blurring of an image can be reduced as compared with the conventional second method.

According to the first embodiment, without reducing the number of effective pixels and without causing a difference between resolutions in the vertical direction and the horizontal direction, blurring of an image is reduced as compared with conventional cases, and without causing image inconsistency at high luminance, the dynamic range can be expanded.

By calculating the total of the total signal charge (second signal charge) of a signal charge accumulated in the field period of the first field and a signal charge accumulated in the field period of the third field, and a first signal charge accumulated in the field period of the second field, a signal charge for one frame is obtained. Accordingly, when a still image is obtained by a camera having the solid-state imaging device, an advantageous effect that a dark current can be corrected can also be obtained.

Figure 12A:
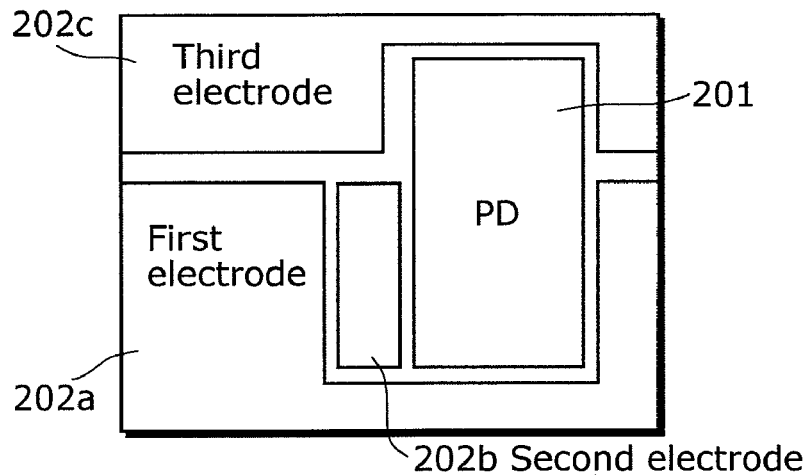
FIGS. 12A to 12D are diagrams for describing a transfer gate according to the first embodiment.
Figure 12B:
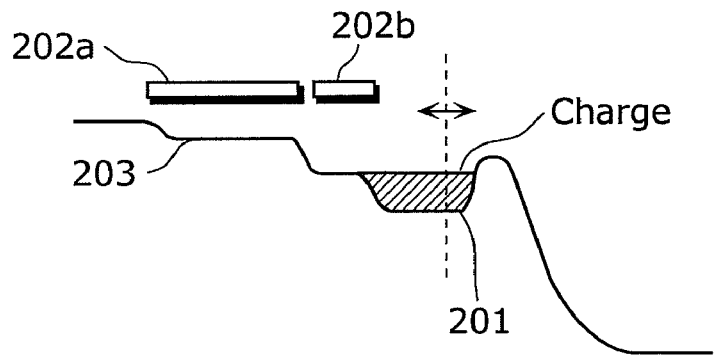
Figure 12C:
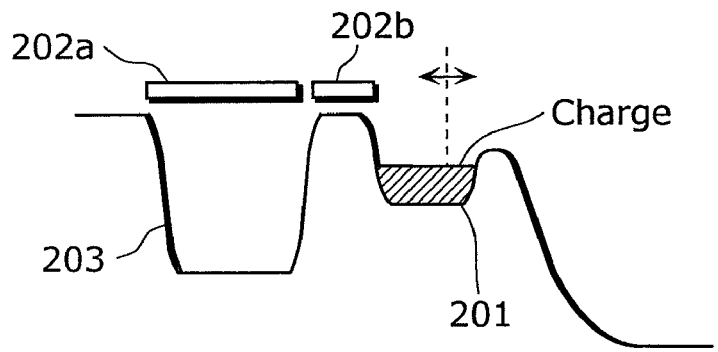
Figure 12D:
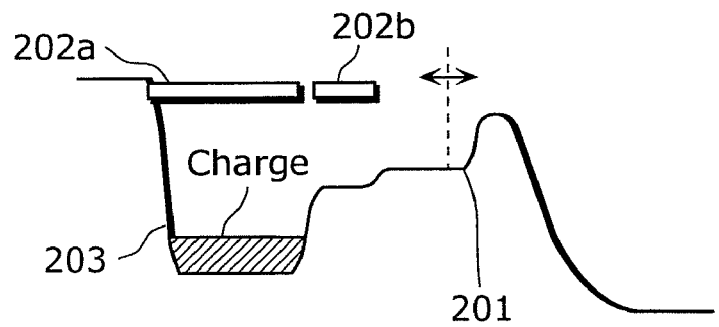

A set of a photodiode 201 and a second transfer gate 202 included in the first memory 200 is arranged as shown in FIG. 12A, as viewed from the top. FIG. 12A shows a first electrode 202a, a second electrode 202b, and a third electrode 202c which are included in the transfer gate 202. FIGS. 12B to 12D show the transfer of a charge. FIG. 12B is a diagram showing a state in which a charge is being transferred into the photodiode 201. In such a case, for example, a voltage of −7V is applied to the first electrode 202a and a voltage of 4V is applied to the second electrode 202b. FIG. 12C is a diagram showing a state in which the charge is being accumulated in the photodiode 201. In such a case, for example, a voltage of 0V is applied to the first electrode 202a and a voltage of 0V is applied to the second electrode 202b. FIG. 12D is a diagram showing a state in which the charge is transferred out of the photodiode 201. In such a case, for example, a voltage of 10V is applied to the first electrode 202a and a voltage of 10V is applied to the second electrode 202b. According to this, a charge is accumulated in the photodiode 201 and further transferred to the subsequent stage.

Note that the vertical CCDs 203 have the ability to transfer charges twice as much as or more than the vertical CCDs 103 can do.

A signal charge (or a value corresponding thereto) accumulated in the field period of the first field, a signal charge (or a value corresponding thereto) accumulated in the field period of the second field, and a signal charge (or a value corresponding thereto) accumulated in the field period of the third field may be added together at once by a single step. The addition is performed by the adding unit 112, for example.

The sensitivity within the field period of the first field and the sensitivity within the field period of the third field may be higher than that in the field period of the second field.

(Modification)

In the first embodiment, one frame includes three fields. In addition, a description is made for the case where in one same pixel, a period (referred to as a "first accumulation period") during which charges are accumulated in the field period of the first field is equal to a period (referred to as a "third accumulation period") during which charges are accumulated in the field period of the third field, and a period (referred to as a "first period") from the first accumulation period to a period (referred to as a "second accumulation period") during which charges are accumulated in the field period of the second field is equal to a period (referred to as a "second period") from the second accumulation period to the third accumulation period. However, it is also possible that the first period is not equal to the second period. As a modification of the first embodiment, a driving method for a solid-state imaging device for the case where the first period is different from the second period will be described below.

Figure 13:
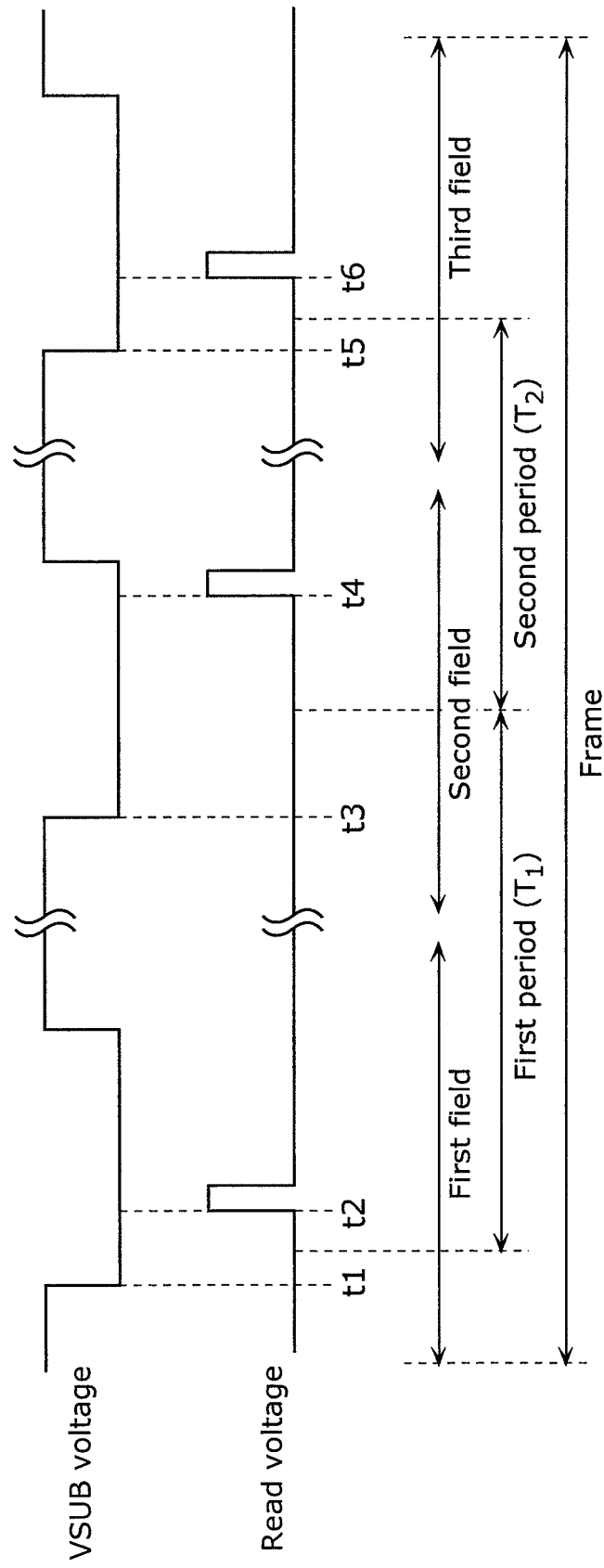
FIG. 13 is a diagram showing pulse waveforms of a VSUB voltage and a read voltage in a first field, a second field, and a third field which are included in one frame, according to a modification of the first embodiment.

FIG. 13 shows pulse waveforms of a VSUB voltage and a read voltage for controlling the electronic shutter, in a first field, a second field, and a third field which are included in one frame.

It is assumed that, in the field period of the first field, a time at which the electronic shutter starts to stop is t1 and a read start time is t2, in the field period of the second field, a time at which the electronic shutter starts to stop is t3 and a read start time is t4, and in the field period of the third field, a time at which the electronic shutter starts to stop is t5 and a read start time is t6.

The time at which the electronic shutter starts to stop is a charge accumulation start time and the read start time is a charge accumulation end time.

Here, a first accumulation period is a period from t1 to t2, a second accumulation period is a period from t3 to t4, and a third accumulation period is a period from t5 to t6.

In this modification, for example, an average time of the first accumulation period (t1+t2)/2 is referred to as a "first accumulation time", an average time of the second accumulation period (t3+t4)/2 is referred to as a "second accumulation time", and an average time of the third accumulation period (t5+t6)/2 is referred to as a "third accumulation time".

Furthermore, a period from the first accumulation time to the second accumulation time is referred to as a "first period (T1)" and a period from the second accumulation time to the third accumulation time is referred to as a "second period (T2)".

Although the sensitivity within the field period of the first field is the same as that in the field period of the third field, their sensitivities are lower than that in the field period of the second field.

Charges accumulated during the first accumulation period in the field period of the first field are referred to as a "signal charge q1" and charges accumulated during the third accumulation period in the field period of the third field are referred to as a "signal charge q3".

A signal charge accumulated in the field period of the second field is referred to as a "signal charge Q2".

Since the length of the first period (T1) is different from the length of the second period (T2), when signal charges obtained in the field periods of the first field and the third field are simply added together, the accumulation time of a signal charge obtained by the simple addition does not match the second accumulation time of the signal charge Q2, and thus, an image which is a result of addition of the signal charge obtained by the simple addition and the signal charge Q2 may suffer from blurring.

In view of this, to prevent image blur, weighted averaging of the signal charge q1 and the signal charge q3 which are obtained in the field periods of two different fields, respectively, is performed using the first period (T1) and the second period (T2). A signal charge (referred to as a "signal charge Q1") obtained by the weighted averaging is expressed by the following equation:

$$Q1=(T2\times q1+T1\times q3)/(T1+T2).$$

According to that, the accumulation time of the signal charge Q1 obtained by performing weighed averaging of the signal charge accumulated in the field period of the first field and the signal charge accumulated in the field period of the third field can be made to mach the accumulation time of the signal charge Q2 accumulated in the field period of the second field.

Figure 14:
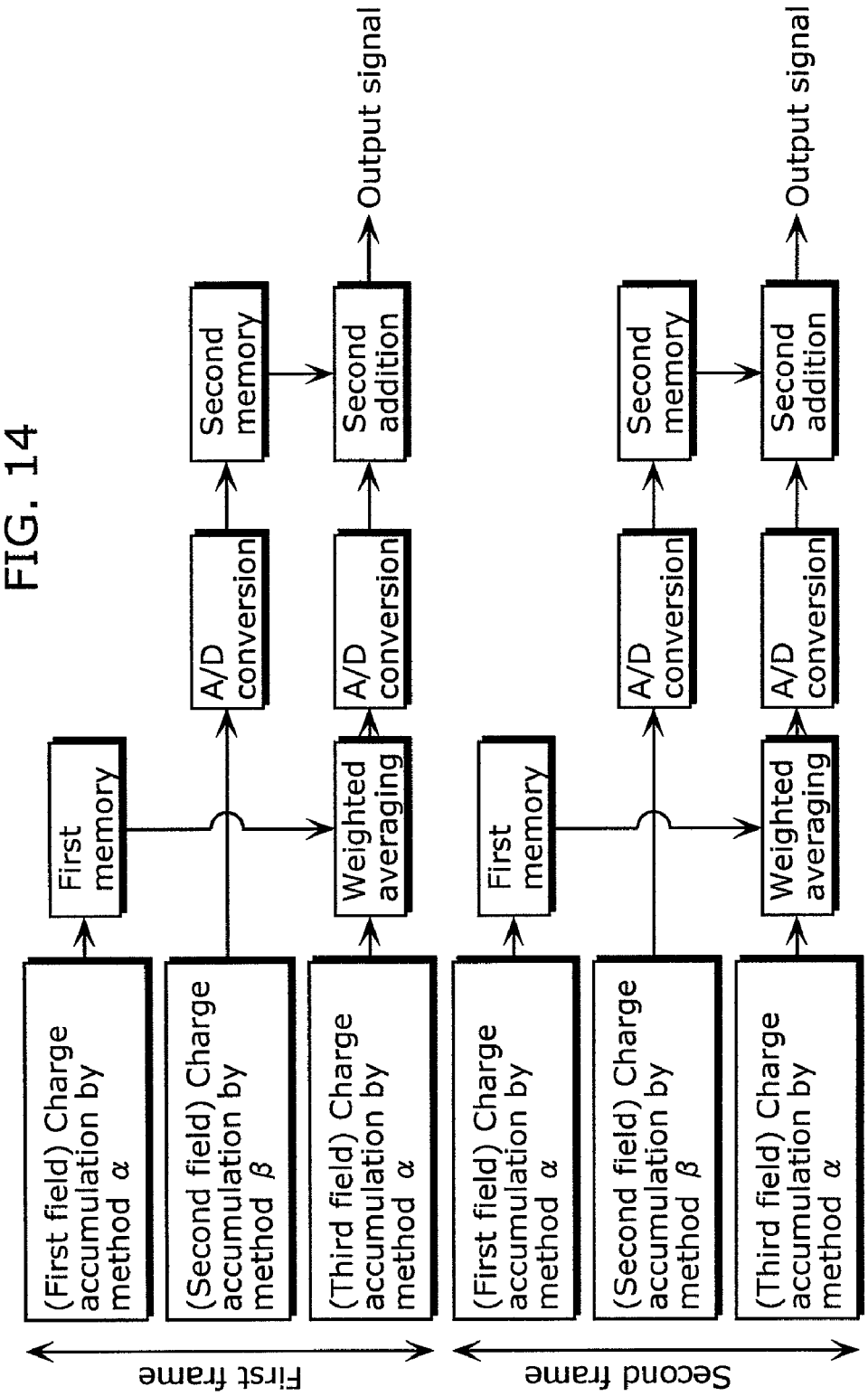
FIG. 14 is a chart showing steps of an operation of the solid-state imaging device, according to the modification of the first embodiment.

FIG. 14 is a chart showing steps of the operation of the solid-state imaging device according to the modification.

In each pixel, in the field period of the first field, the photodiodes 101 included in the photoelectric conversion region (solid-state imaging element) 100 accumulate, during a period between the times t1 and t2, charges according to the amount of incident light as a signal charge q1, by a low-sensitivity imaging method α. The charges accumulated as the signal charge q1 are transferred to the vertical CCDs 103 through the first transfer gates 102 and further transferred to the first memory 200. The photodiodes 201 included in the first memory 200 accumulate the charges transferred from corresponding photodiodes 101.

In the field period of the second field, the photodiodes 101 included in the photoelectric conversion region (solid-state imaging element) 100 accumulate, during a period between the times t3 and t4, charges according to the amount of incident light as a signal charge Q2, by a high-sensitivity imaging method β. The charges accumulated as the signal charge Q2 are transferred to the vertical CCDs 103 through the first transfer gates 102, and then transferred to the vertical CCDs 203, and further transferred to the horizontal CCD 300. Thereafter, the charges are transferred to the output unit 108. The output unit 108 converts the charges from the horizontal CCD 300, into a voltage value corresponding to the charges and outputs the voltage value to the A/D conversion unit 109. The A/D conversion unit 109 converts the value from the output unit 108, i.e., the analog voltage value corresponding to the signal charge Q2 accumulated in the second field, into a digital value. The obtained digital value is accumulated in the second memory 111.

In the field period of the third field, the photodiodes 101 included in the photoelectric conversion region (solid-state imaging element) 100 accumulate, during a period between the times t5 and t6, charges according to the amount of incident light as a signal charge q3, by the low-sensitivity imaging method α. The charges accumulated as the signal charge q3 are transferred to the vertical CCDs 103 through the first transfer gates 102 and further transferred to the first memory 200. The vertical CCDs 203 included in the first memory 200 performs weighted averaging of the signal charge q1 which is the charges accumulated in the photodiodes 201 and the signal charge q3 which is the charges transferred from corresponding photodiodes 101, so as to obtain a signal charge Q1. A weighted averaging method used here is the same as that described above. The signal charge Q1 is transferred to the horizontal CCD 300 and thereafter transferred to the output unit 108. The output unit 108 converts the charge from the horizontal CCD 300, into a voltage value corresponding to the charge and outputs the voltage value to the A/D conversion unit 109. The A/D conversion unit 109 converts the value from the output unit 108, i.e., the analog voltage value corresponding to the signal charge Q2 accumulated in the second field, into a digital value. The obtained digital value is accumulated in the second memory 111. The A/D conversion unit 109 converts the value from the output unit 108, i.e., the analog voltage value corresponding to the signal charge Q1 obtained by weighted averaging, into a digital value. The adding unit 112 adds together the value corresponding to the signal charge Q2 from the A/D conversion unit 109, and the value corresponding to the signal charge Q1 accumulated in the second memory 111. The output unit 114 outputs a value obtained by the adding unit 112 to outside of the solid-state imaging device.

As such, even when the length of the first period (T1) is different from the length of the second period (T2), by performing weighted averaging of a signal charge q1 and a signal charge q3 which are obtained in the field periods of two different fields, respectively, using the first period (T1) and the second period (T2), the accumulation time of a signal charge Q1 is made to match the accumulation time of a signal charge Q2, and then the signal charge Q1 and the signal charge Q2 can be added together, making it possible to prevent image blurring upon imaging a moving image.

Furthermore, the length of the first period (T1) does not need to be made equal to the length of the second period (T2), which in turn eases constrains in design; accordingly, an advantageous effect that constraints in design are eased is also provided.

Although the modification describes the case where the sensitivity within the field period of the first field is equal to the sensitivity within the field period of the third field, the sensitivity within the field period of the first field may be different from the sensitivity within the field period of the third field. In such a case, by using the same technique, weighted averaging of the sensitivity within the field period of the first field and the sensitivity within the field period of the third field is performed to make those sensitivities match each other.

Second Embodiment

A configuration of a solid-state imaging device according to a second embodiment will be described.

Figure 15:
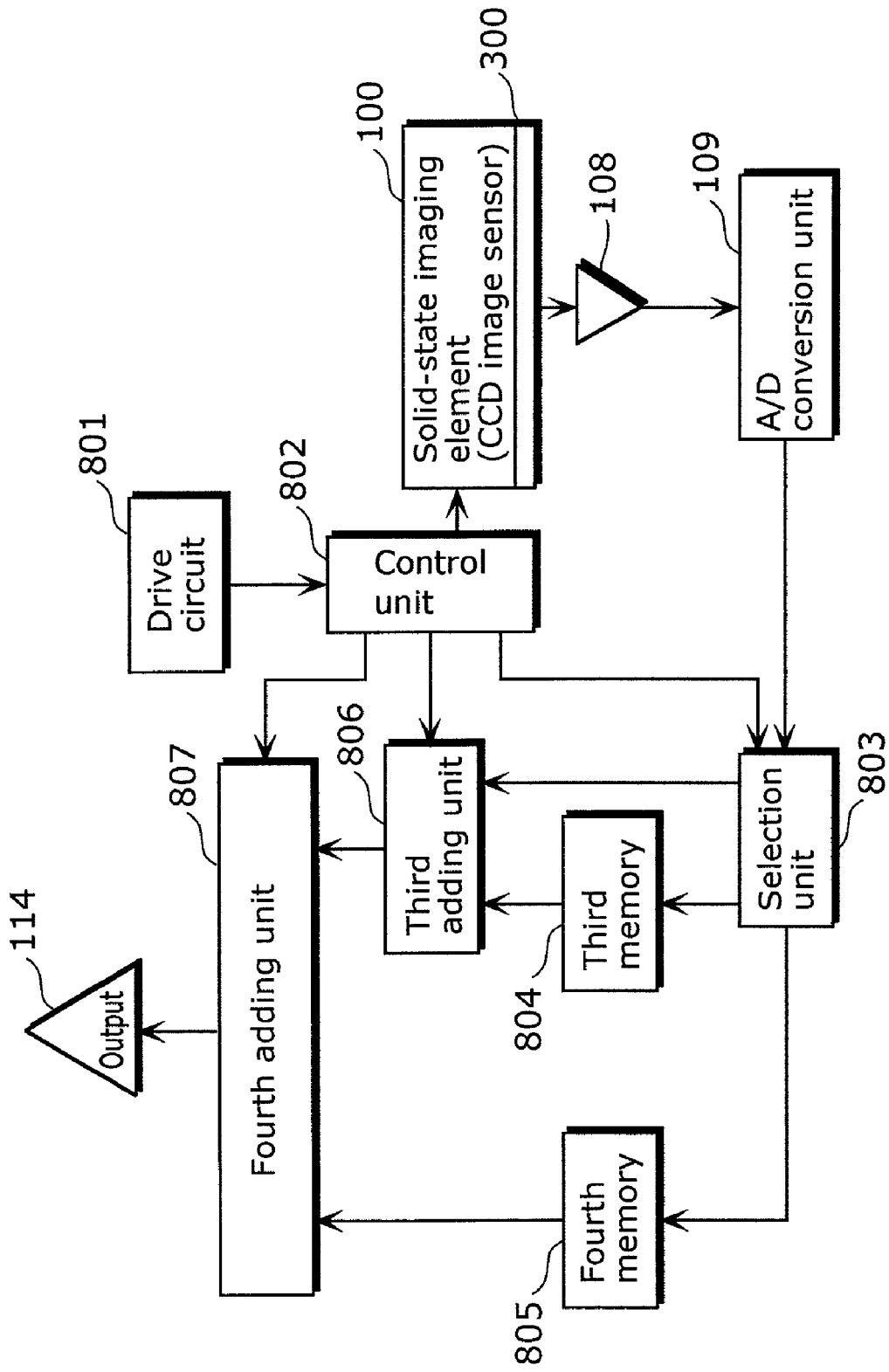
FIG. 15 is a configuration diagram of a solid-state imaging device according to a second embodiment.

FIG. 15 is a configuration diagram of the solid-state imaging device according to the second embodiment. The solid-state imaging device according to the second embodiment includes a solid-state imaging element (a CCD image sensor, a photoelectric conversion region) 100, a horizontal CCD 300, an output unit 108, an A/D conversion unit 109, a drive unit 801, a control unit 802, a selection unit 803, a third memory 804, a fourth memory 805, a third adding unit 806, a fourth adding unit 807, and an output unit 114.

The solid-state imaging element (the CCD image sensor, the photoelectric conversion region) 100, the horizontal CCD 300, the output unit 108, the A/D conversion unit 109, and the output unit 114 are components shown in the first embodiment. The drive unit 801 drives the control unit 802 based on a drive signal from outside of the solid-state imaging device. The control unit 802 controls the operation of the solid-state imaging element (the CCD image sensor, the photoelectric conversion region) 100, the horizontal CCD 300, the output unit 108, the selection unit 803, the third adding unit 806, and the fourth adding unit 807. The selection unit 803 transfers, based on an instruction from the control unit 802, a value converted by the A/D conversion unit 109 into any of the third memory 804, the fourth memory 805, and the third adding unit 806. The third memory 804 and the fourth memory 805 hold the value converted by the A/D conversion unit 109. The third adding unit 806 adds together the value from the selection unit 803 and the value held in the third memory 804. The fourth adding unit 807 adds together a value from the third adding unit 806 and a value held in the fourth memory 805.

Figure 16:
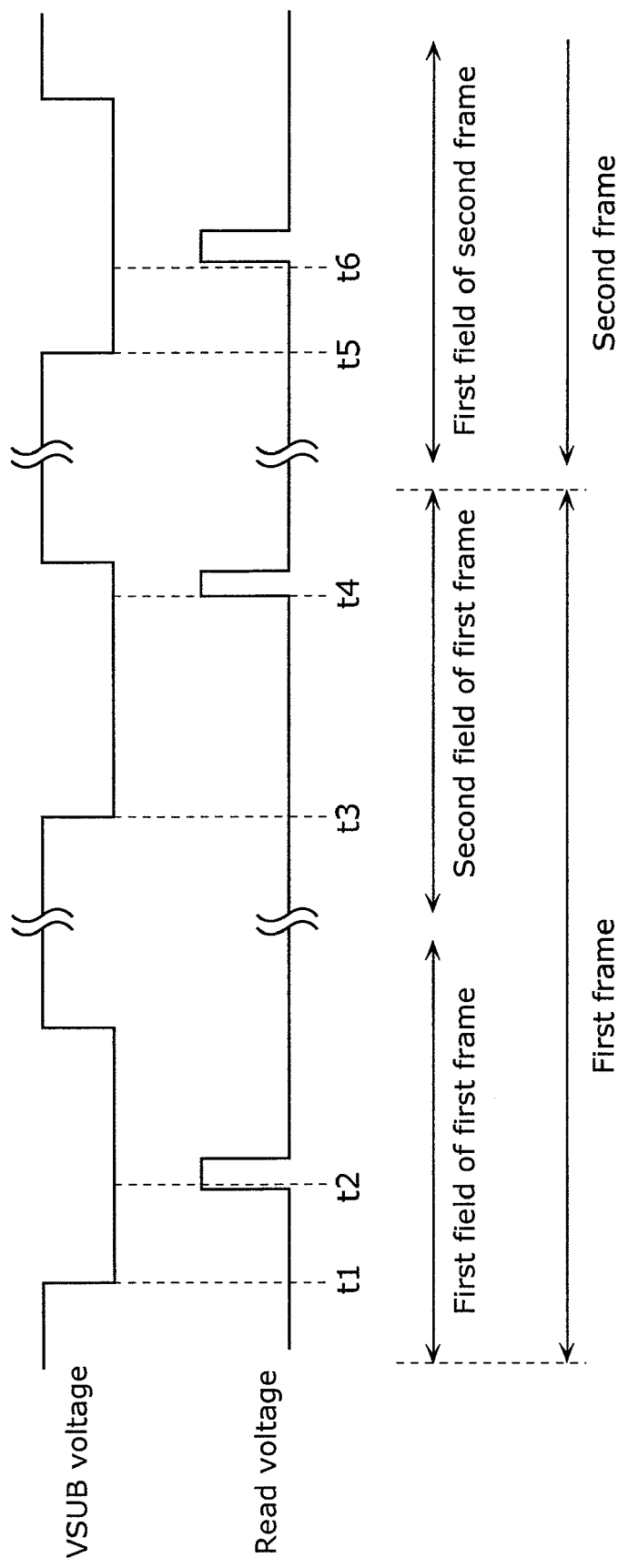
FIG. 16 is a diagram showing pulse waveforms of a VSUB voltage and a read voltage in a first field of a first frame, a second field of the first frame, and a first field of the second frame, according to the second embodiment.

Now, the operation of the solid-state imaging device according to the second embodiment will be described. In the second embodiment, one frame includes two fields. In one same pixel, the sensitivity within a field period of a first field is lower than that in a field period of a second field. The term "sensitivity" has the same meaning as a "charge accumulation period". That is, the longer the accumulation period the higher the sensitivity, and the shorter the accumulation period the lower the sensitivity. FIG. 16 shows pulse waveforms of a VSUB voltage and a read voltage for controlling the electronic shutter, in a first field and a second field which are included in one frame.

It is assumed that, in a field period of a first field of a first frame, a time at which the electronic shutter starts to stop is t1 and a read start time is t2, in a field period of a second field of the first frame, a time at which the electronic shutter starts to stop is t3 and a read start time is t4, and in a field period of a first field of a second frame, a time at which the electronic shutter starts to stop is t5 and a read start time is t6. The first frame and the second frame are successive frames and the first frame temporally precedes the second frame.

The time at which the electronic shutter starts to stop is a charge accumulation start time and the read start time is a charge accumulation end time. As described above, the sensitivity within the field period of the first field is lower than that in the field period of the second field. The term "sensitivity" has the same meaning as a "charge accumulation period". That is, the longer the accumulation period the higher the sensitivity, and the shorter the accumulation period the lower the sensitivity; therefore, there is a high correlation between an image to be obtained from a first signal charge and an image to be obtained from a second signal charge. Furthermore, an average of the accumulation start times in the field period of the first field of the first frame and the field period of the first field of the second frame and an average of the accumulation end times in the field period of the first field of the first frame and the field period of the first field of the second frame are within an accumulation period in the field period of the second field of the first frame. These facts can be represented by the following expressions:

$$t2-t1=t6-t5<t4-t3$$

$$t3<(t1+t5)/2<(t2+t6)/2<t4.$$

According to these relationships, the total (second signal charge) of a signal charge accumulated in the field period of the first field of the first frame and a signal charge accumulated in the field period of the first field of the second frame is close to a signal charge accumulated in the field period of the second field of the first frame (first signal charge obtained in the field period of the second field). That is, there is a high correlation between an image to be obtained from the second signal charge and an image to be obtained from the first signal charge. This is because, since an average time at which the second signal charge is accumulated (an average of the accumulation time in the first field and the accumulation time in the third field) matches the time at which the first signal charge is accumulated, an image obtained from the second signal charge can be considered as an image obtained at the same time as an image obtained from the first signal charge.

It is desirable that the sensitivity within the field period of the second field of the first frame be set so that it includes a luminance which is equivalent to the maximum contrast resolving power of human eyes. The total (second signal charge) of a signal charge accumulated in the field period of the first field of the first frame and a signal charge accumulated in the field period of the first field of the second frame is close to a signal charge accumulated in the field period of the second field of the first frame (first signal charge obtained in the field period of the second field). That is, there is a high correlation between an image to be obtained from the second signal charge and an image to be obtained from the first signal charge. This is because, since an average time at which the second signal charge is accumulated (an average of the accumulation time in the first field and the accumulation time in the third field) matches the time at which the first signal charge is accumulated, an image obtained from the second signal charge can be considered as an image obtained at the same time as an image obtained from the first signal charge.

However, the first signal charge and the second signal charge are, in practice, signals accumulated at different times and thus there is almost no chance that in a moving image the first signal charge completely matches the second signal charge. To obtain video that does not give an uncomfortable feeling to human vision, the accumulation period in the field period of the second field is set so that information of a luminance which is equivalent to the maximum contrast resolving power of human eyes can be obtained in the field period of the second field.

Figure 17:
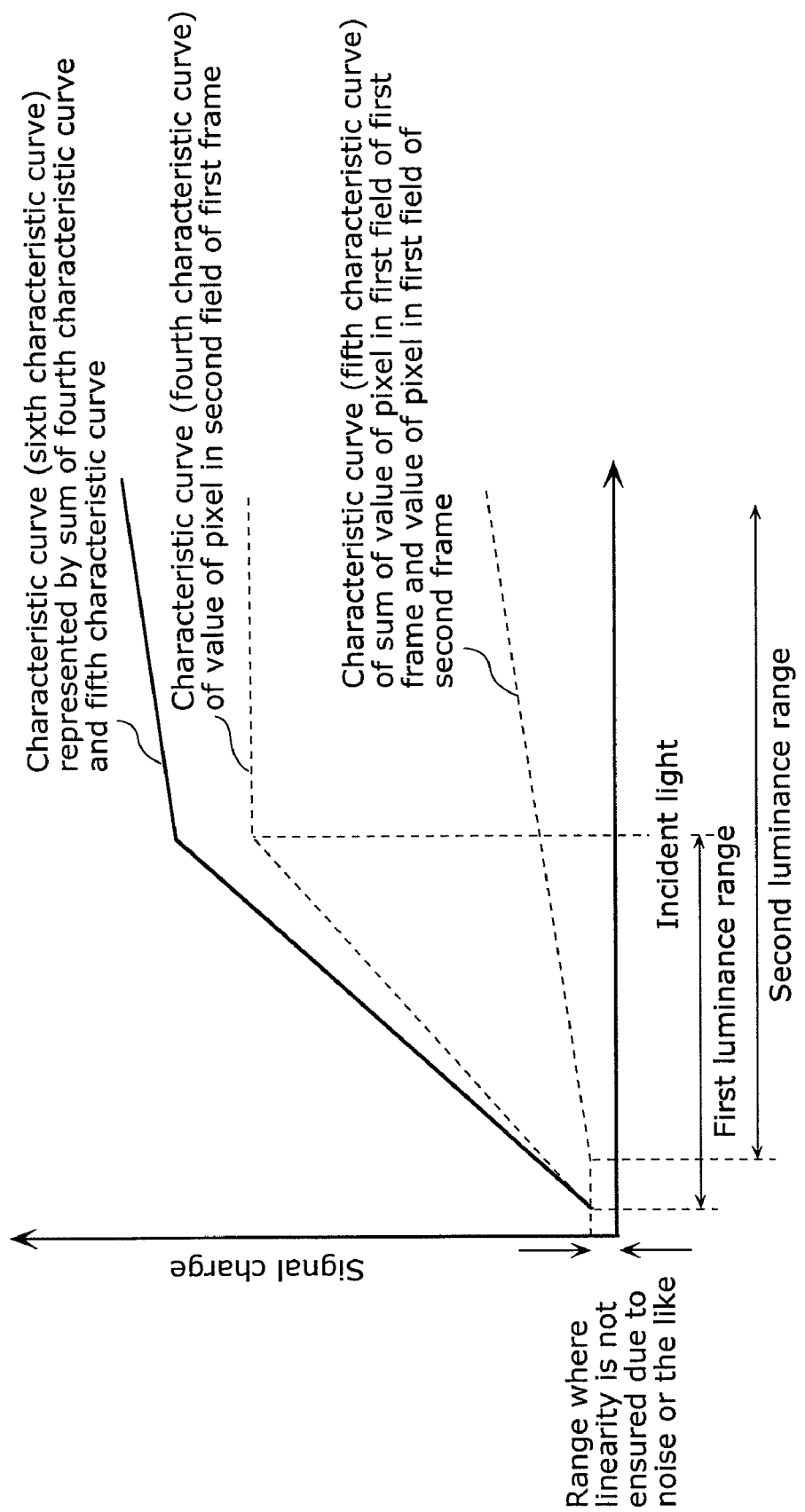
FIG. 17 is a diagram showing characteristic curves showing a relationship between incident light and a signal charge, according to the second embodiment.

FIG. 17 shows a characteristic curve (fifth characteristic curve) showing a second signal charge, which is the total signal charge of a signal charge accumulated in the field period of the first field of the first frame and a signal charge accumulated in the field period of the first field of the second frame, changing relative to luminance, a characteristic curve (fourth characteristic curve) showing a first signal charge, which is a signal charge accumulated in the field period of the second field of the first frame, changing relative to luminance, and a characteristic curve (sixth characteristic curve) represented by the sum of the fourth characteristic curve and the fifth characteristic curve. The first signal charge linearly changes, in a first luminance range, with the change in luminance. The second signal charge linearly changes, in a second luminance range, with the change in luminance. Note that a loss of linearity at low luminance in both the first luminance range and the second luminance range results from that noise components, such as a dark current, shot noise, and a flaw, and low-luminance light called "dark black" are not detected as signal information. Furthermore, a loss of linearity at high luminance results mainly from the saturation of a photodiode and a transfer capacitor. From FIG. 17, a range where the signal charge linearly changes relative to luminance is a range where the first luminance range and the second luminance range are added together, and is obviously expanded as compared with the first luminance range. That is, the dynamic range is expanded.

Figure 18:
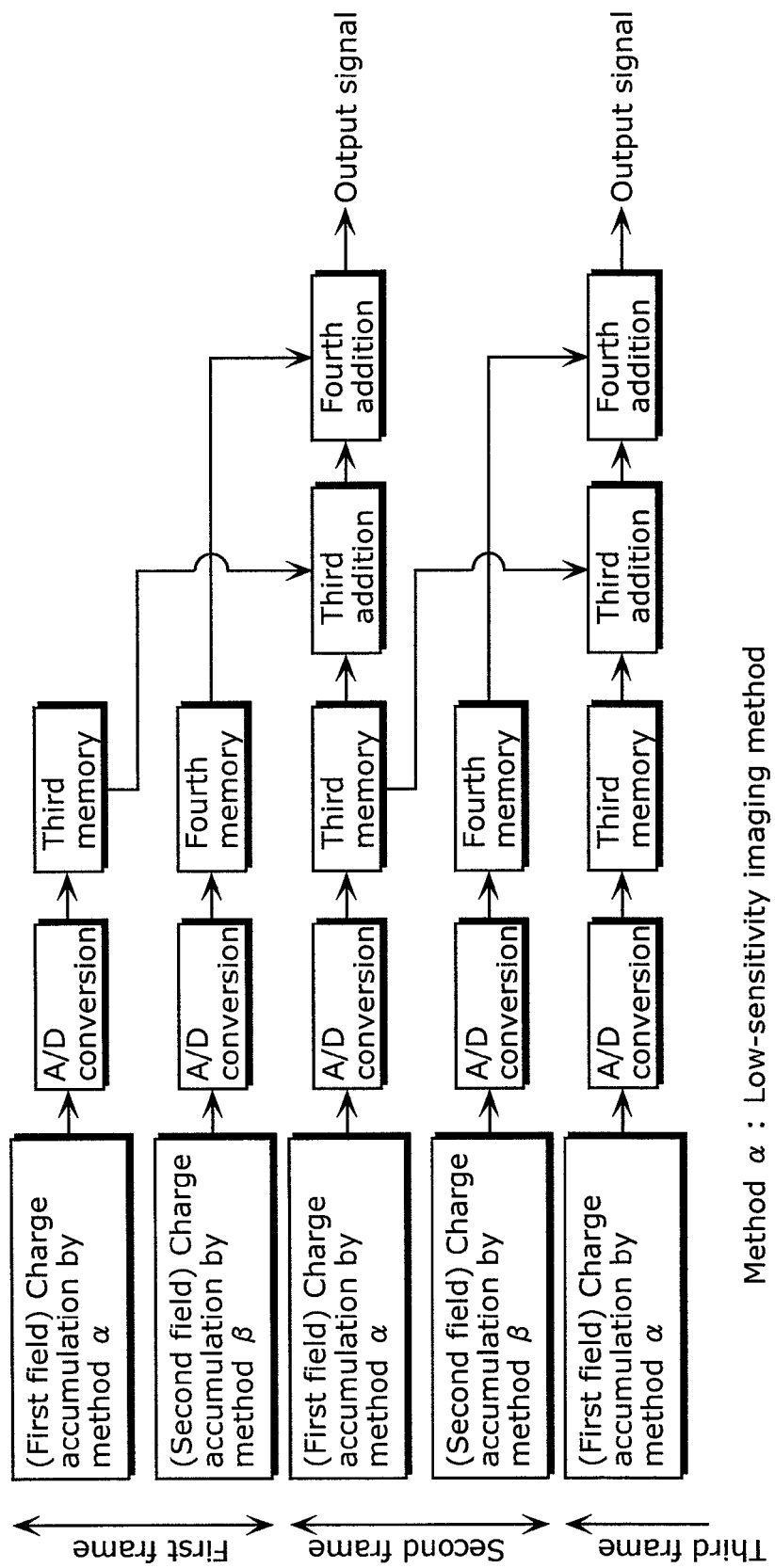
FIG. 18 is a chart showing steps of an operation of the solid-state imaging device, according to the second embodiment.

FIG. 18 is a chart showing steps of the operation of the solid-state imaging device according to the second embodiment.

In each pixel, in the field period of the first field of the first frame, the solid-state imaging element 100 accumulates, during a period between the times t1 and t2, charges according to the amount of incident light, by a low-sensitivity imaging method α. The horizontal CCD 300 transfers the charges accumulated by the solid-state imaging element 100 to the output unit 108. The output unit 108 converts the transferred charges into a voltage value corresponding to the charges and outputs the voltage value to the A/D conversion unit 109. The A/D conversion unit 109 converts the value from the output unit 108, i.e., the analog voltage value corresponding to the charges accumulated in the field period of the first field of the first frame, into a digital value. The converted value (value corresponding to the second signal charge) is accumulated in the third memory 804.

In the field period of the second field of the first frame, the solid-state imaging element 100 accumulates, during a period between the times t3 and t4, charges according to the amount of incident light, by a high-sensitivity imaging method β. The horizontal CCD 300 transfers the charges accumulated by the solid-state imaging element 100 to the output unit 108. The output unit 108 converts the transferred charges into a voltage value corresponding to the charges and outputs the voltage value to the A/D conversion unit 109. The A/D conversion unit 109 converts the value from the output unit 108, i.e., the analog voltage value corresponding to the charges accumulated in the field period of the second field of the first frame, into a digital value. The converted value is accumulated in the fourth memory 805.

In the field period of the first field of the second frame, the solid-state imaging element 100 accumulates, during a period between the times t5 and t6, charges according to the amount of incident light, by the low-sensitivity imaging method α. The horizontal CCD 300 transfers the charges accumulated by the solid-state imaging element 100 to the output unit 108. The output unit 108 converts the transferred charges into a voltage value corresponding to the charges and outputs the voltage value to the A/D conversion unit 109. The A/D conversion unit 109 converts the value from the output unit 108, i.e., the analog voltage value corresponding to the charges accumulated in the field period of the first field of the second frame, into a digital value. The third adding unit 806 adds together the converted value, i.e., the voltage value corresponding to the charges accumulated in the field period of the first field of the second frame, and the value accumulated in the third memory 804, so as to calculate a value corresponding to the second signal charge. The fourth adding unit 807 adds together the value corresponding to the second signal charge obtained by the third adding unit 806 and the value accumulated in the fourth memory 805. The output unit 114 outputs a value obtained by the fourth adding unit 807 to outside of the solid-state imaging device.

According to the second embodiment, without reducing the number of effective pixels and without causing a difference between resolutions in the vertical direction and the horizontal direction, blurring of an image is reduced as compared with conventional cases, and without causing image inconsistency at high luminance, the dynamic range can be expanded. Furthermore, comparing with the first embodiment, the above-described advantageous effects can be obtained by an operation using a normal frame method that does not requires a special third field, and thus, a configuration of a drive circuit is facilitated. In addition, comparing with the first embodiment, one frame includes two fields and thus an increase in speed of the operation of each unit is also easily achieved.

A signal charge (or a value corresponding thereto) accumulated in the field period of the first field of the first frame, a signal charge (or a value corresponding thereto) accumulated in the field period of the second field of the first frame, and a signal charge (or a value corresponding thereto) accumulated in the field period of the first field of the second frame may be added together at once by a single step. The addition is performed by the fourth adding unit 807, for example.

The sensitivity within the field period of the first field of the first frame and the sensitivity within the field period of the first field of the second frame may be higher than that in the field period of the second field of the first frame.

(Modification)

In the first embodiment one frame includes three fields and in the second embodiment one frame includes two fields. However, one frame may include four or more fields. A driving method for a solid-state imaging device for the cases in which one frame includes four fields and in which one frame includes five fields will be described below.

Figure 19:
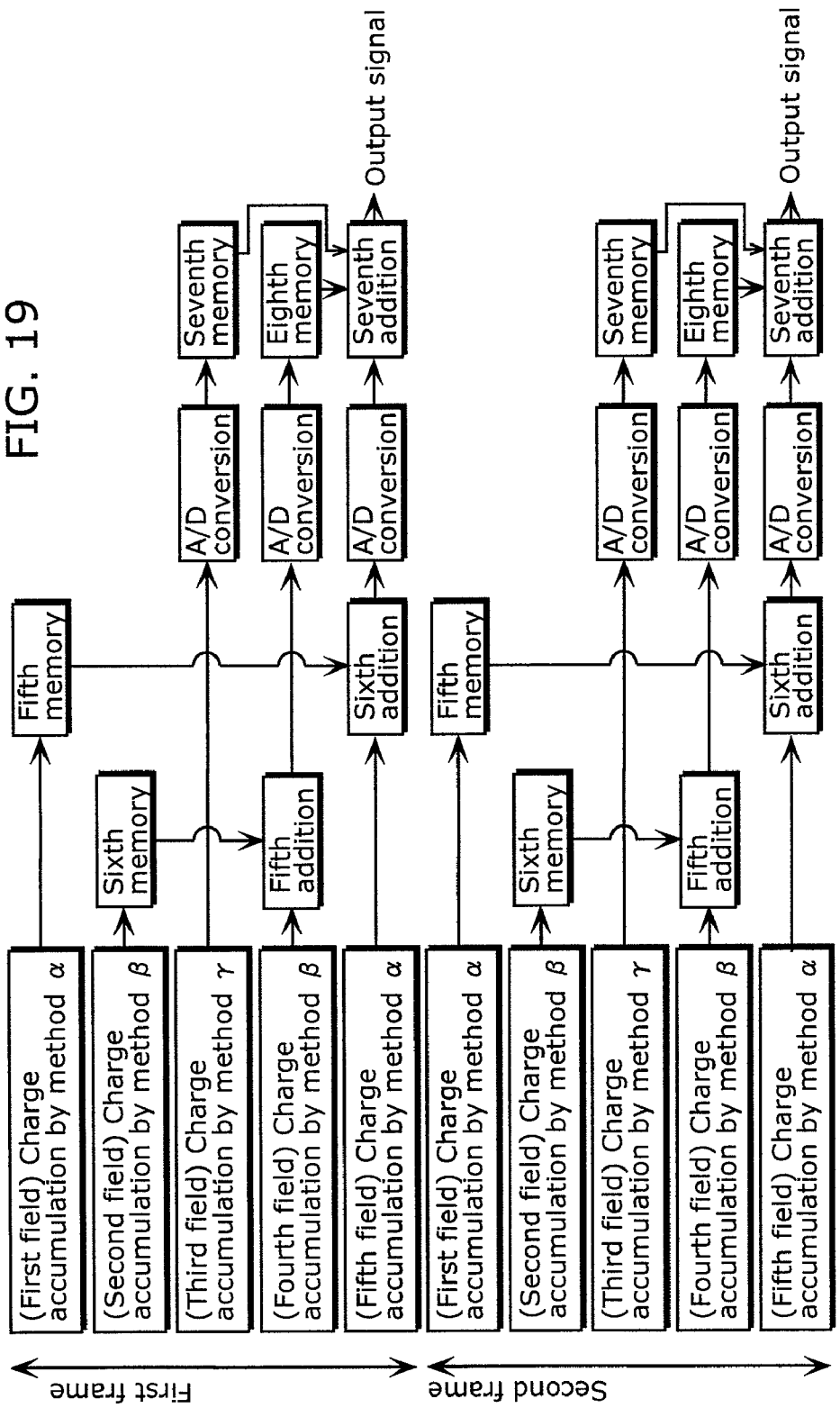
FIG. 19 is a chart showing steps of an operation of the solid-state imaging device, according to a first modification.

First, a driving method for a solid-state imaging device for the case where one frame includes five fields will be described. FIG. 19 is a chart for describing the driving method for the solid-state imaging device for the above-described case.

In each pixel, in a field period of a first field, photodiodes accumulate, during a period between times t1 and t2, charges according to the amount of incident light, by a low-sensitivity imaging method α. A fifth memory holds the accumulated charges.

In a field period of a second field, the photodiodes accumulate, during a period between times t3 and t4 (>times t1 and t2), charges according to the amount of incident light, by a high-sensitivity imaging method β. A sixth memory holds the accumulated charges.

In a field period of a third field, the photodiodes accumulate, during a period between times t5 and t6 (>times t3 and t4), charges according to the amount of incident light, by an imaging method γ with a sensitivity higher than that of the imaging method β. An A/D conversion unit performs A/D conversion on a voltage value corresponding to the accumulated charges, and a seventh memory holds the value obtained by the A/D conversion.

In a field period of a fourth field, the photodiodes accumulate, during a period between times t7 and t8 (=times t3 and t4), charges according to the amount of incident light, by the high-sensitivity imaging method β. A fifth adding unit adds together the charges accumulated in the photodiodes and the charges held in the sixth memory. The A/D conversion unit performs A/D conversion on a voltage value corresponding to charges obtained by the addition, and an eighth memory holds the value obtained by the A/D conversion.

In a field period of a fifth field, the photodiodes accumulate, during a period between times t9 and t10 (=times t3 and t4), charges according to the amount of incident light, by the low-sensitivity imaging method α. A sixth adding unit adds together the charges accumulated in the photodiodes and the charges held in the fifth memory. The A/D conversion unit performs A/D conversion on a voltage value corresponding to charges obtained by the addition, and a seventh adding unit adds together the value obtained by the A/D conversion, the value held in the seventh memory, and the value held in the eighth memory, whereby a signal charge for one frame is obtained.

Figure 20:
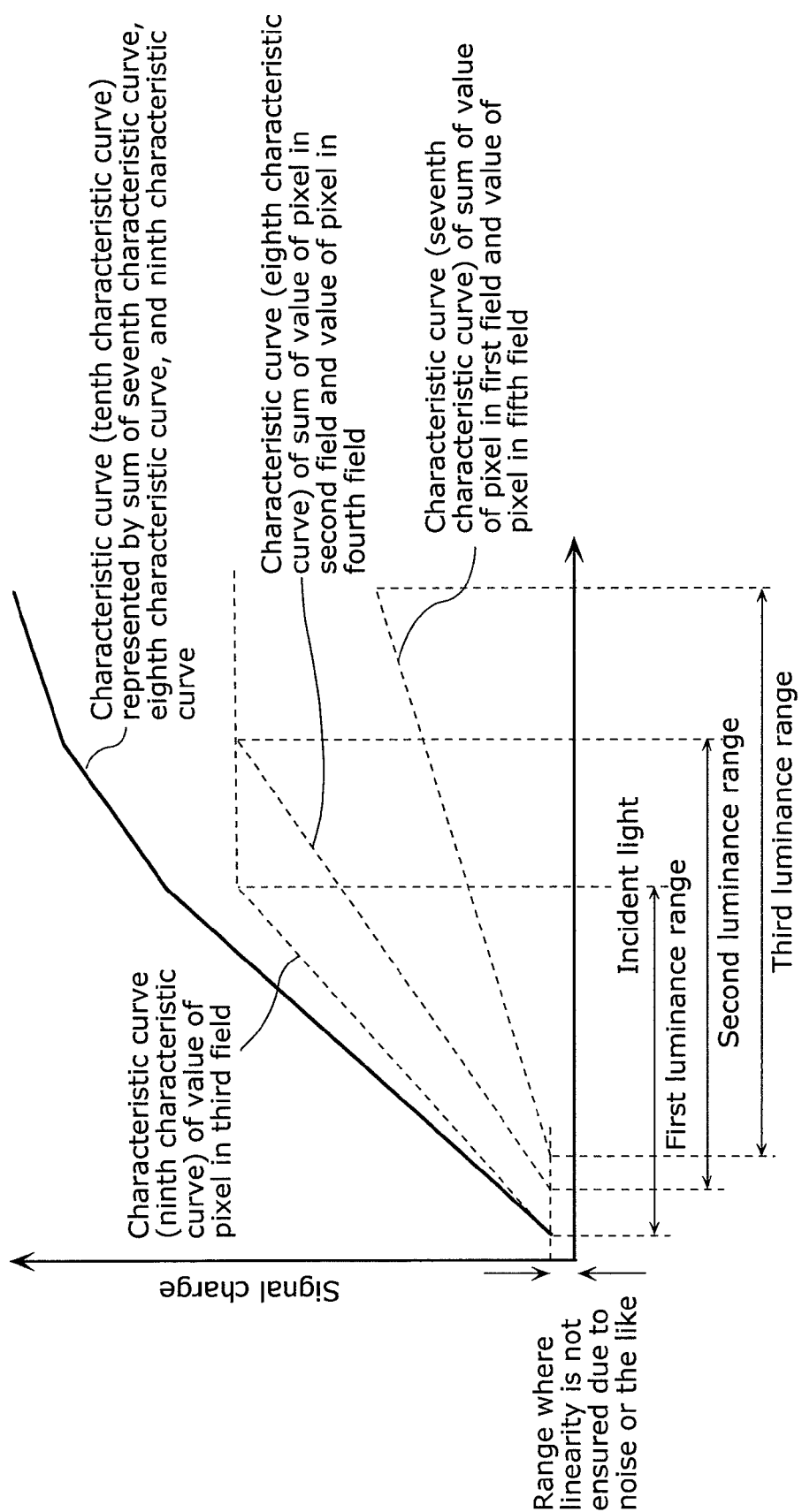
FIG. 20 is a diagram showing characteristic curves showing a relationship between incident light and a signal charge, according to the first modification.

FIG. 20 shows a characteristic curve (seventh characteristic curve) showing a third signal charge, which is the total signal charge of a signal charge accumulated in the field period of the first field and a signal charge accumulated in the field period of the fifth field, changing relative to luminance, a characteristic curve (eighth characteristic curve) showing a second signal charge, which is the total signal charge of a signal charge accumulated in the field period of the second field and a signal charge accumulated in the field period of the fourth field, changing relative to luminance, a characteristic curve (ninth characteristic curve) showing a first signal charge, which is a signal charge accumulated in the field period of the third field, changing relative to luminance, and a characteristic curve (tenth characteristic curve) represented by the sum of the seventh characteristic curve, the eighth characteristic curve, and the ninth characteristic curve. The first signal charge linearly changes, in a first luminance range, with the change in luminance. The second signal charge linearly changes, in a second luminance range, with the change in luminance. The third signal charge linearly changes, in a third luminance range, with the change in luminance. Note that a loss of linearity at low luminance in the first luminance range, the second luminance range, and the third luminance range results from that noise components, such as a dark current, shot noise, and a flaw, and low-luminance light called "dark black" are not detected as signal information. Furthermore, a loss of linearity at high luminance results mainly from the saturation of a photodiode and the capacity of a transfer path. From FIG. 20, a range where the signal charge linearly changes relative to luminance is a range where the first luminance range, the second luminance range, and the third luminance range are added together, and is obviously expanded as compared with the first luminance range. That is, the dynamic range is expanded.

When one frame includes five or more odd number fields, a signal charge for one frame is obtained, as with the above-described case, by adding together a signal charge (or a value corresponding thereto) accumulated in a field period of a field (a first signal charge obtaining field) other than fields at both ends within a frame, and the total (or a value corresponding thereto) of signal charges accumulated in field periods of two fields within the frame which are located at a temporally equal distance from the first signal charge obtaining field. When there are a plurality of sets of two fields within a frame which are located at a temporally equal distance from a first signal charge obtaining field, a signal charge for one frame is obtained by adding together the total (or a value corresponding thereto) of signal charges of at least one set and a signal charge (or a value corresponding thereto) accumulated in the first signal charge obtaining field.

Figure 21:
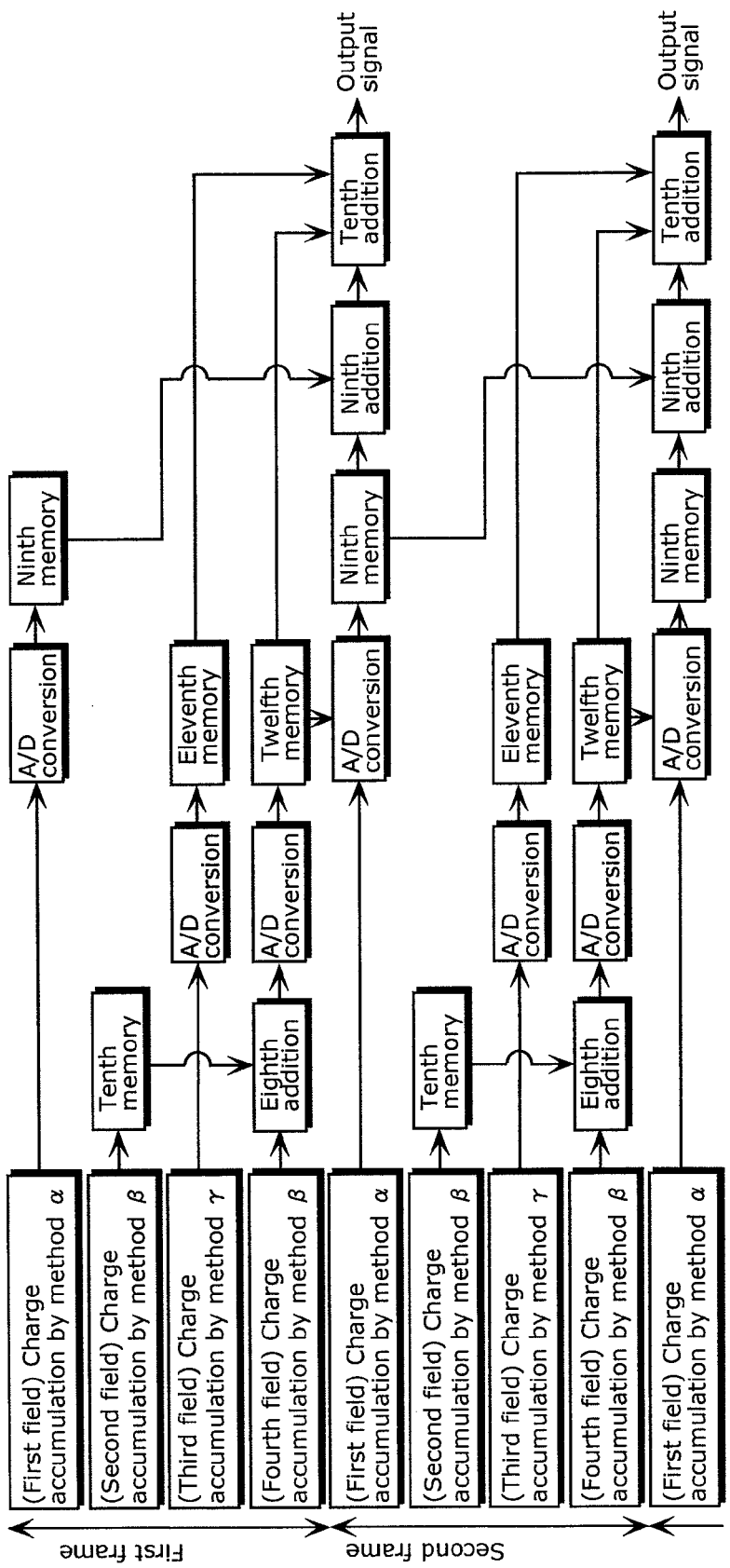
FIG. 21 is a chart showing steps of an operation of the solid-state imaging device, according to a second modification.

Next, a driving method for a solid-state imaging device for the case where one frame includes four fields will be described. FIG. 21 is a chart for describing the driving method for the solid-state imaging device for this case.

In each pixel, in a field period of a first field of a first frame, photodiodes accumulate, during a period between times t1 and t2, charges according to the amount of incident light, by a low-sensitivity imaging method α. An A/D conversion unit performs A/D conversion on a voltage value corresponding to the accumulated charges, and a ninth memory holds the value obtained by the A/D conversion.

In a field period of a second field of the first frame, the photodiodes accumulate, during a period between times t3 and t4 (>times t1 and t2), charges according to the amount of incident light, by a high-sensitivity imaging method β. A tenth memory holds the accumulated charges.

In a field period of a third field of the first frame, the photodiodes accumulate, during a period between times t5 and t6 (>times t3 and t4), charges according to the amount of incident light, by an imaging method γ with a sensitivity higher than that of the imaging method β. The A/D conversion unit performs A/D conversion on a voltage value corresponding to the accumulated charges, and an eleventh memory holds the value obtained by the A/D conversion.

In a field period of a fourth field of the first frame, the photodiodes accumulate, during a period between times t7 and t8 (=times t3 and t4), charges according to the amount of incident light, by the high-sensitivity imaging method β. An eighth adding unit adds together the charges accumulated in the photodiodes and the charges held in the tenth memory. The A/D conversion unit performs A/D conversion on a voltage value corresponding to charges obtained by the addition, and a twelfth memory holds the value obtained by the A/D conversion.

In a field period of a first field of a second frame, the photodiodes accumulate, during a period between times t9 and t10 (=times t1 and t2), charges according to the amount of incident light, by the low-sensitivity imaging method α. The A/D conversion unit performs A/D conversion on a voltage value corresponding to the accumulated charges, and the ninth memory holds the value obtained by the A/D conversion. A ninth adding unit adds together the value which is obtained in the field period of the first field of the first frame and held in the ninth memory, and the value which is obtained in the field period of the first field of the second frame and held in the ninth memory. A tenth adding unit adds together a value obtained by the ninth adding unit, the value held in the eleventh memory, and the value held in the twelfth memory, whereby a signal charge for one frame is obtained.

Figure 22:
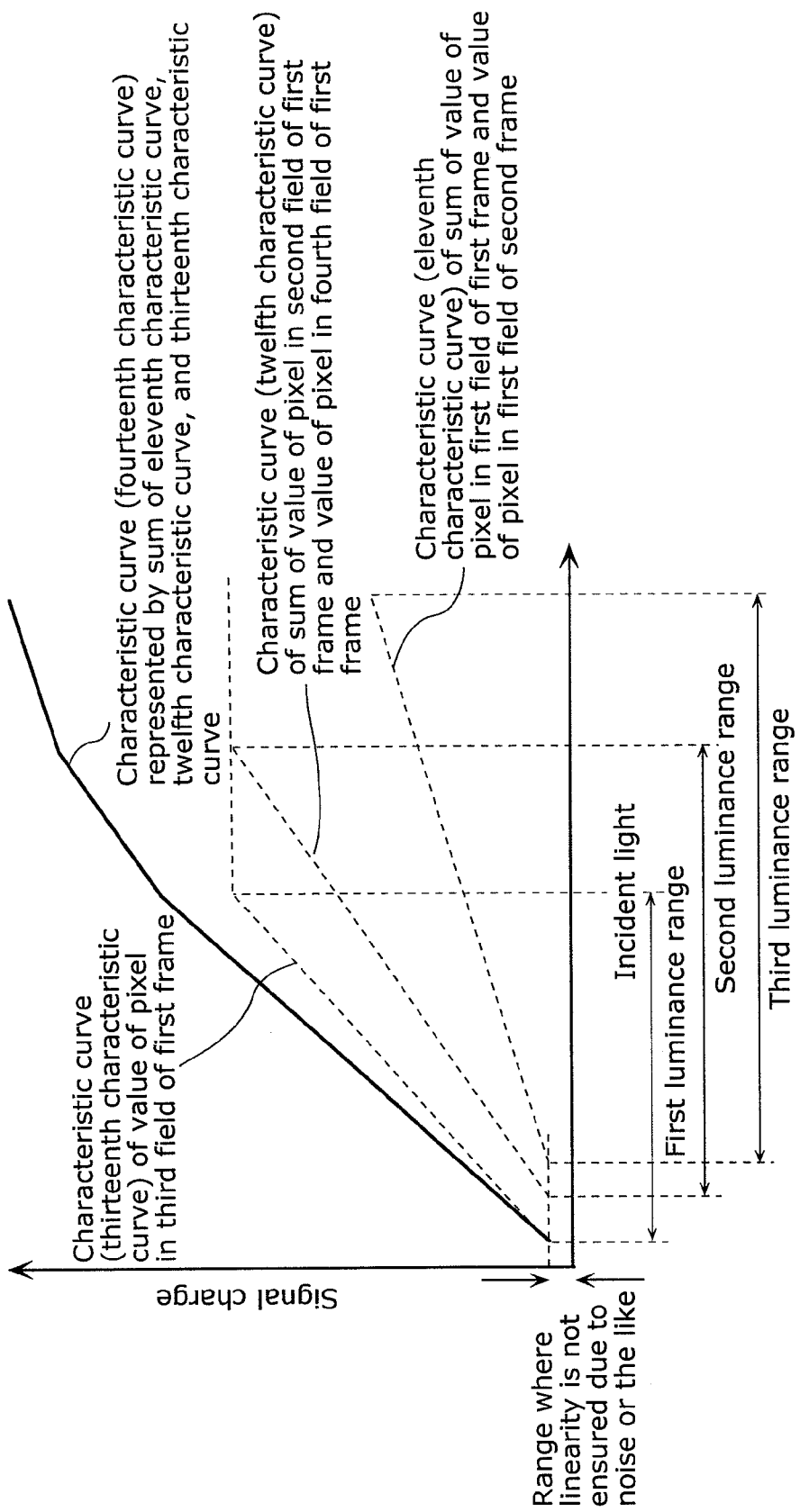
FIG. 22 is a diagram showing characteristic curves showing a relationship between incident light and a signal charge, according to the second modification.

FIG. 22 shows a characteristic curve (eleventh characteristic curve) showing a third signal charge, which is the total signal charge of a signal charge accumulated in the field period of the first field of the first frame and a signal charge accumulated in the field period of the first field of the second frame, changing relative to luminance, a characteristic curve (twelfth characteristic curve) showing a second signal charge, which is the total signal charge of a signal charge accumulated in the field period of the second field of the first frame and a signal charge accumulated in the field period of the fourth field of the first frame, changing relative to luminance, a characteristic curve (thirteenth characteristic curve) showing a first signal charge, which is a signal charge accumulated in the field period of the third field of the first frame, changing relative to luminance, and a characteristic curve (fourteenth characteristic curve) represented by the sum of the eleventh characteristic curve, the twelfth characteristic curve, and the thirteenth characteristic curve. The first signal charge linearly changes, in a first luminance range, with the change in luminance. The second signal charge linearly changes, in a second luminance range, with the change in luminance. The third signal charge linearly changes, in a third luminance range, with the change in luminance. Note that a loss of linearity at low luminance in the first luminance range, the second luminance range, and the third luminance range results from that noise components, such as a dark current, shot noise, and a flaw, and low-luminance light called "dark black" are not detected as signal information. Furthermore, a loss of linearity at high luminance results mainly from the saturation of a photodiode and the capacity of a transfer path. From FIG. 22, a range where the signal charge linearly changes relative to luminance is a range where the first luminance range, the second luminance range, and the third luminance range are added together, and is obviously expanded as compared with the first luminance range. That is, the dynamic range is expanded.

When one frame includes four or more even number fields, a signal charge for one frame is obtained, as with the above-described case, by adding together a signal charge (or a value corresponding thereto) accumulated in a field period of a particular field (a first signal charge obtaining field) within a frame, and the total (or a value corresponding thereto) of signal charges accumulated in two fields located at a temporally equal distance from the first signal charge obtaining field. When there are a plurality of sets of two fields located at a temporally equal distance from a first signal charge obtaining field, a signal charge for one frame is obtained by adding together the total (or a value corresponding thereto) of signal charges of at least one of these two sets and a signal charge (or a value corresponding thereto) accumulated in the first signal charge obtaining field.

As used in the claims, the term "signal charge" means a "signal charge" itself or a "value such as an analog or digital voltage value corresponding to a signal charge".

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The solid-state imaging devices and the driving method therefor of the present invention are useful for a solid-state imaging device having incorporated therein a solid-state imaging element, such as a CCD image sensor or a CMOS image sensor, to be used in a video movie camera, a digital still camera, a mobile camera, a medical camera, a surveillance camera, or the like, that provides good output image quality.

What is claimed is:

1. A driving method for a solid-state imaging device having pixels arranged in a matrix, said method comprising:
   for each of the pixels,
   holding a first signal charge in a first holding unit, the first signal charge being generated from incident light at a first sensitivity within a field period of a field which temporally precedes a predetermined field, of two different fields located at a temporally equal distance from the predetermined field, and the two different fields and the predetermined field being included in a frame;
   holding a second signal charge in a second holding unit, the second signal charge being generated from incident light at a second sensitivity within a field period of the predetermined field; and
   adding the first signal charge held in the first holding unit, the second signal charge held in the second holding unit, and a third signal charge which is generated from incident light at the first sensitivity within a field period of a field which temporally follows the predetermined field, of the two different fields,
   wherein the adding comprises:
   adding the first signal charge held in the first holding unit and the third signal charge; and
   adding the second signal charge held in the second holding unit and a signal charge which is a result of the addition of the first signal charge and the third signal charge.

2. The driving method for the solid-state imaging device according to claim 1,
   wherein the frame includes a temporal series of a first field, a second field and a third field,
   the predetermined field is the second field,
   the adding of the first and third signal charges adds the first signal charge generated from the incident light at the first sensitivity within the field period of the first field and the third signal charge generated from the incident light at the first sensitivity within the field period of the third field, and
   the adding of the second signal charge and the signal charge which is a result of adding the first and third signal charges adds the second signal charge generated from the incident light at the second sensitivity within the field period of the second field and the signal charge which is the result of the addition of the first and third signal charges, so as to calculate a signal charge of the frame.

3. The driving method for the solid-state imaging device according to claim 1,
   wherein the two different fields located at the temporally equal distance from the predetermined field are two fields located adjacent to both sides of the predetermined field.

4. The driving method for the solid-state imaging device according to claim 1, wherein the first sensitivity is higher than the second sensitivity.

5. The driving method for the solid-state imaging device according to claim 1,
wherein the first sensitivity is lower than the second sensitivity.

6. The driving method for the solid-state imaging device according to claim 1,
wherein the second sensitivity is determined so that a signal charge increases linearly with an increase in an amount of the incident light, until a luminance which is equivalent to a maximum contrast resolving power of human eyes is generated from the incident light.

7. The driving method for the solid-state imaging device according to claim 1,
wherein the first sensitivity and the second sensitivity are determined by an electronic shutter of the solid-state imaging device.

8. A solid-state imaging device comprising:
a photoelectric converter that includes pixels arranged in a matrix;
for each of the pixels, a first holding unit operable to hold a first signal charge generated from incident light at a first sensitivity within a field period of a field which temporally precedes a predetermined field, of two different fields located at a temporally equal distance from the predetermined field, the two different fields and the predetermined field being included in a frame;
for each of the pixels, a second holding unit operable to hold a second signal charge generated from incident light at a second sensitivity within a field period of the predetermined field;
for each of the pixels, an adder operable to add the first signal charge held in said first holding unit, the second signal charge held in said second holding unit, and a third signal charge which is generated from incident light at the first sensitivity within a field period of a field which temporally follows the predetermined field, of the two different fields; and
a controller operable to control the first sensitivity and the second sensitivity,
wherein said adder includes:
for each of the pixels, a first adder that adds the first signal charge held in said first holding unit and the third signal charge; and
for each of the pixels, a second adder that adds the second signal charge held in said second holding unit and a signal charge which is a result of the addition performed by said first adder,
wherein said photoelectric converter includes:
photodiodes for conversion provided for the pixels to convert incident light into charge;
first charge transfer paths, each of which is provided for corresponding photodiodes of said photodiodes for conversion; and
first transfer gates, through each of which the charge generated by each of said photodiodes for conversion is transferred to a corresponding one of said first charge transfer paths,
said first holding unit includes:
the same number of photodiodes for accumulation as said photodiodes for conversion, which are arranged in a same form as said photodiodes for conversion;
second charge transfer paths, each of which is provided for corresponding photodiodes of said photodiodes for accumulation; and
second transfer gates, through each of which the charge accumulated in each of said photodiodes for conversion, of said photoelectric converter, is transferred to and is accumulated in each of said photodiodes for accumulation, and then the charge accumulated in each of the photodiodes for accumulation is read, and
said second charge transfer path functions as said first adder.

9. The solid-state imaging device according to claim 8,
wherein said second charge transfer path allows a transfer of charge twice as much as or more than charge which can be transferred through said first charge transfer path.

10. The solid-state imaging device according to claim 8, further comprising
an electronic shutter,
wherein said controller is operable to determine the first sensitivity and the second sensitivity by controlling said electronic shutter.

* * * * *